United States Patent
Geng et al.

(10) Patent No.: US 11,696,191 B2
(45) Date of Patent: Jul. 4, 2023

(54) METHOD AND DEVICE TO IMPLEMENT DATA TRANSMISSION BETWEEN A SOURCE BASE STATION AND A TARGET BASE STATION IN A RE-ESTABLISHMENT PROCEDURE BETWEEN A TERMINAL DEVICE AND THE TARGET BASE STATION

(71) Applicant: Huawei Technologies Co., Ltd., Shenzhen (CN)

(72) Inventors: Tingting Geng, Shanghai (CN); Hongping Zhang, Shanghai (CN); Le Yan, Shenzhen (CN); Yinghao Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 17/171,758

(22) Filed: Feb. 9, 2021

(65) Prior Publication Data
US 2021/0168669 A1   Jun. 3, 2021

Related U.S. Application Data

(63) Continuation of application No. PCT/CN2019/100188, filed on Aug. 12, 2019.

(30) Foreign Application Priority Data

Aug. 10, 2018 (CN) .......................... 201810910241.8

(51) Int. Cl.
*H04W 36/00* (2009.01)
*H04W 76/19* (2018.01)

(52) U.S. Cl.
CPC ... *H04W 36/0033* (2013.01); *H04W 36/0055* (2013.01); *H04W 76/19* (2018.02)

(58) Field of Classification Search
CPC . H04W 36/08; H04W 36/0033; H04W 76/27; H04W 8/08; H04W 76/19;
(Continued)

(56) References Cited

U.S. PATENT DOCUMENTS

| | | | |
|---|---|---|---|
| 10,939,339 B2 * | 3/2021 | Van Lieshout | ... H04W 36/0058 |
| 2013/0182563 A1 | 7/2013 | Johansson et al. | |

(Continued)

FOREIGN PATENT DOCUMENTS

| | | |
|---|---|---|
| CN | 101848536 A | 9/2010 |
| CN | 102143539 A | 8/2011 |

(Continued)

OTHER PUBLICATIONS

Ericsson; "Data forwarding aspects for intra-system ACTIVE mobility—DC TP for XnAP", 3GPP TSG-RAN WG3 Meeting #99bis, R3-182184, Sanya, P.R. China, Apr. 16-20, 2018, 14 pages.

(Continued)

*Primary Examiner* — Allahyar Kasraian
(74) *Attorney, Agent, or Firm* — Slater Matsil, LLP

(57) ABSTRACT

Embodiments of this application provide a data transmission method and device. The method includes: obtaining, by a first access network device, a first message from a second access network device, where the first message requests context information of a terminal device; and sending, by the first access network device, a data packet to the second access network device. The first access network device is a corresponding access network device of the terminal device before the re-establishment procedure, and the second access network device is a corresponding access network device when the terminal device initiates the re-establishment procedure.

18 Claims, 9 Drawing Sheets

(58) Field of Classification Search
CPC ......... H04W 36/0055; H04W 36/0088; H04W 40/24; H04W 8/24; H04W 76/30
See application file for complete search history.

(56) References Cited

U.S. PATENT DOCUMENTS

| | | | |
|---|---|---|---|
| 2016/0095018 A1 | 3/2016 | Vajapeyam et al. | |
| 2016/0174282 A1 | 6/2016 | Grant et al. | |
| 2018/0199398 A1 | 7/2018 | Dao et al. | |
| 2019/0132782 A1* | 5/2019 | Kim | H04W 76/10 |
| 2020/0389823 A1* | 12/2020 | Xu | H04W 76/20 |
| 2021/0211960 A1* | 7/2021 | Ryu | H04W 36/0011 |
| 2021/0235314 A1* | 7/2021 | Huang | H04W 92/20 |
| 2021/0352547 A1* | 11/2021 | Chang | H04W 36/0079 |

FOREIGN PATENT DOCUMENTS

| | | |
|---|---|---|
| CN | 102348191 A | 2/2012 |
| CN | 103533586 A | 1/2014 |
| CN | 103906152 A | 7/2014 |
| WO | 2014022970 A1 | 2/2014 |
| WO | 2018111030 A1 | 6/2018 |

OTHER PUBLICATIONS

3GPP TS 36.413 V15.2.0 (Jun. 2018); 3rd Generation Partnership Project; Technical Specification Group Radio Access Network; Evolved Universal Terrestrial Radio Access Network (E-UTRAN): S1 Application Protocol (S1AP) (Release 15); 378 pages.

Ericsson, "Inactive Mode in NG RAN", 3GPP TSG-RAN WG3 Meeting #95bis, R3-171149, Spokane, WA, US, Apr. 3-7, 2017, 18 pages.

3GPP TS 36.423 V15.2.0 (Jun. 2018); 3rd Generation Partnership Project; Technical Specification Group Radio Access Network; Evolved Universal Terrestrial Radio Access Network (E-UTRAN); X2 application protocol (X2AP) (Release 15); 389 pages.

3GPP TS 37.340 V15.2.0 (Jun. 2018); 3rd Generation Partnership Project; Technical Specification Group Radio Access Network; Evolved Universal Terrestrial Radio Access (E-UTRA) and NR; Multi-connectivity; Stage 2 (Release 15); 55 pages.

3GPP TS 38.300 V15.2.0 (Jun. 2018); 3rd Generation Partnership Project; Technical Specification Group Radio Access Network; NR; NR and NG-RAN Overall Description; Stage 2 (Release 15); 87 pages.

3GPP TS 38.423 V15.0.0 (Jun. 2018); 3rd Generation Partnership Project; Technical Specification Group Radio Access Network; NG-RAN; Xn application protocol (XnAP) (Release 15); 195 pages.

Samsung et al.,"UE Context Fetch Procedure in Xn", 3GPP TSG-RAN WG3#100, R3-183497, Busan, South Korea, May 21-25, 2018, 5 pages.

* cited by examiner

METHOD AND DEVICE TO IMPLEMENT DATA TRANSMISSION BETWEEN A SOURCE BASE STATION AND A TARGET BASE STATION IN A RE-ESTABLISHMENT PROCEDURE BETWEEN A TERMINAL DEVICE AND THE TARGET BASE STATION

CROSS-REFERENCE TO RELATED APPLICATIONS

This application is a continuation of International Application No. PCT/CN2019/100188, filed on Aug. 12, 2019, which claims priority to Chinese Patent Application No. 201810910241.8, filed on Aug. 10, 2018. The disclosures of the aforementioned applications are hereby incorporated by reference in their entireties.

TECHNICAL FIELD

This application relates to the field of communications technologies, and in particular, to a data transmission method and device.

BACKGROUND

If a connection failure occurs when a terminal device in a connected mode is connected to a source cell or a source base station, the terminal device needs to initiate a radio resource control (RRC) re-establishment request to a target base station in a new cell or the source cell, to complete an RRC connection re-establishment procedure between the target base station and the terminal device. A reason for the connection failure may be a radio link failure (RLF), a handover failure (HOF), an integrity protection check failure, a reconfiguration failure, or the like.

If the connection failure occurs between the terminal device and the source base station, an RRC connection between the terminal device and the target base station needs to be re-established.

How to transmit data between the source base station and the target base station in the re-establishment procedure between the terminal device and the target base station is an urgent problem to be resolved.

SUMMARY

Embodiments of this application provide a data transmission method and device, to implement data transmission between a source base station and a target base station in a re-establishment procedure between a terminal device and the target base station.

According to a first aspect, an embodiment of this application provides a data transmission method, including the following.

A first access network device obtains a first message from a second access network device. The first message requests context information of a terminal device.

The first access network device sends a data packet to the second access network device.

The first access network device is a corresponding access network device of the terminal device before a re-establishment procedure, and the second access network device is a corresponding access network device when the terminal device initiates the re-establishment procedure.

In this solution, after receiving the first message that is sent by the second access network device and that requests the context information of the terminal device, the first access network device learns that the terminal device requests connection establishment with the second access network device, that is, the first access network device learns that the terminal device performs a connection re-establishment procedure. Therefore, the first access network device sends the data packet to the second access network device, to implement data transmission between the first access network device and the second access network device in the re-establishment procedure.

In a possible design, the method further includes the following.

The first access network device obtains protocol data unit (PDU) service receiving information of the second access network device from the second access network device. The PDU service receiving information includes identifier information of a first PDU session accepted by the second access network device and/or identifier information of a second PDU session rejected by the second access network device. The first PDU session and the second PDU session are PDU sessions of the terminal device established in the first access network device.

That the first access network device sends the data packet to the second access network device includes the following.

The first access network device sends the data packet based on the PDU service receiving information.

In this design, the second access network device sends, to the first access network device, the identifier information of the first PDU session accepted by the second access network device and/or the identifier information of the second PDU session rejected by the second access network device, so that the first access network device sends a data packet corresponding to the first PDU session and does not send a data packet corresponding to the second PDU session to the second access network device. Therefore, when the second PDU session exists, data packets sent by the first access network device to the second access network device may be reduced, thereby reducing signaling overheads.

In a possible design, the PDU service receiving information further includes identifier information of a first quality of service (QoS) flow accepted by the second access network device and/or identifier information of a second QoS flow rejected by the second access network device. The first QoS flow and the second QoS flow are QoS flows corresponding to a service of the terminal device established in the first access network device.

In this design, the second access network device sends, to the first access network device, the identifier information of the first QoS flow accepted by the second access network device and/or the identifier information of the second QoS flow rejected by the second access network device, so that the first access network device sends a data packet related to the first QoS flow to the second access network device. Therefore, when the second QoS flow exists, data packets sent by the first access network device to the second access network device may be reduced, thereby reducing signaling overheads.

In a possible design, the PDU service receiving information further includes first information and/or second information.

The first information includes identifier information of a first data radio bearer (DRB) that requires data forwarding, and an uplink general packet radio service tunneling protocol (GTP) tunnel address and/or a downlink general packet radio service tunneling protocol GTP tunnel address corresponding to the first DRB. The first DRB is a DRB corresponding to the service of the terminal device established in the first access network device. The second information includes a GTP tunnel address corresponding to the first PDU session.

In this design, the first access network device may send, to the second access network device based on the GTP tunnel address corresponding to the first PDU session, the data packet corresponding to the first PDU session, so that the first access network device sends, to the second access network device based on the GTP tunnel address corresponding to the first PDU session and/or the uplink GTP tunnel address and/or the downlink GTP tunnel address corresponding to the DRB, a data packet that is carried by a corresponding DRB corresponding to the QoS flow accepted by the second access network device.

In a possible design, the method further includes: The first access network device sends transmission status indication information to the second access network device. The transmission status indication information indicates a transmission status of a data packet of the service of the terminal device established in the first access network device.

The transmission status indication information includes: identifier information of a DRB; length information of a count value of a data packet; and a count value assigned by the second access network device to a next downlink data packet that has not been assigned a count value.

In this design, the second access network device may learn how to assign a count value to a downlink data packet corresponding to the service of the terminal device established in the first access network device.

In a possible design, the transmission status indication information further includes at least one of the following: a count value of the first uplink data packet lost by the first access network device, so that the second access network device can learn of a count value of another lost uplink data packet based on the count value of the lost first uplink data packet; and first indication information used to indicate whether an uplink data packet sent by the terminal device is successfully received by the first access network device, so that the second access network device can learn of a specific uplink data packet that is not successfully received by the first access network device.

In conclusion, the first access network device sends the transmission status indication information to the second access network device, so that the second access network device can learn of a transmission status of an uplink PDCP data packet and/or a downlink PDCP data packet that are/is carried by the DRB of the terminal device established in the first access network device, or learn of a transmission status of an uplink PDCP data packet and/or a downlink PDCP data packet that are/is carried by the first DRB that is of the terminal device established in the first access network device, that is accepted by the second access network device, and that requires data forwarding, so that the service of the terminal device established in the first access network device can be normally continued on the second access network device.

According to a second aspect, an embodiment of this application provides a data transmission method, including the following.

A second access network device sends a first message to a first access network device. The first message requests context information of a terminal device.

The second access network device receives a data packet from the first access network device.

The first access network device is a corresponding access network device of the terminal device before a re-establishment procedure, and the second access network device is a corresponding access network device when the terminal device initiates the re-establishment procedure.

In this solution, after the second access network device sends, to the first access network device, the first message that requests the context information of the terminal device, the first access network device learns that the terminal device requests connection establishment with the second access network device, that is, the first access network device learns that the terminal device performs a connection re-establishment procedure. Therefore, the first access network device can send the data packet to the second access network device, to implement data transmission between the first access network device and the second access network device in the re-establishment procedure.

In a possible design, the method further includes the following.

The second access network device sends protocol data unit PDU service receiving information to the first access network device. The PDU service receiving information includes identifier information of a first PDU session accepted by the second access network device and/or identifier information of a second PDU session rejected by the second access network device. The first PDU session and the second PDU session are PDU sessions of the terminal device established in the first access network device.

In this design, the second access network device sends, to the first access network device, the identifier information of the first PDU session accepted by the second access network device and/or the identifier information of the second PDU session rejected by the second access network device, so that the first access network device sends a data packet corresponding to the first PDU session and does not send a data packet corresponding to the second PDU session to the second access network device. Therefore, when the second PDU session exists, data packets sent by the first access network device to the second access network device may be reduced, thereby reducing signaling overheads.

In a possible design, the PDU service receiving information further includes identifier information of a first quality of service QoS flow accepted by the second access network device and/or identifier information of a second QoS flow rejected by the second access network device. The first QoS flow and the second QoS flow are QoS flows corresponding to a service of the terminal device established in the first access network device.

In this design, the second access network device sends, to the first access network device, the identifier information of the first QoS flow accepted by the second access network device and/or the identifier information of the second QoS flow rejected by the second access network device, so that the first access network device sends a data packet related to the first QoS flow to the second access network device. Therefore, when the second QoS flow exists, data packets sent by the first access network device to the second access network device may be reduced, thereby reducing signaling overheads.

In a possible design, the PDU service receiving information further includes first information and/or second information.

The first information includes identifier information of a first data radio bearer DRB that requires data forwarding, and an uplink general packet radio service tunneling protocol GTP tunnel address and/or a downlink general packet radio service tunneling protocol GTP tunnel address corresponding to the first DRB. The first DRB is a DRB corresponding to the service of the terminal device established in the first access network device. The second information includes a GTP tunnel address corresponding to the first PDU session.

In this design, the first access network device may send, to the second access network device based on the GTP tunnel address corresponding to the first PDU session, a data packet corresponding to the first PDU session, so that the first access network device sends, to the second access network device based on the GTP tunnel address corresponding to the first PDU session and/or the uplink GTP tunnel address and/or the downlink GTP tunnel address corresponding to the DRB, a data packet that is carried by a corresponding DRB corresponding to the QoS flow accepted by the second access network device.

In a possible design, the method further includes the following.

The second access network device obtains transmission status indication information from the first access network device. The transmission status indication information indicates a transmission status of a data packet of the service of the terminal device established in the first access network device.

The transmission status indication information includes: identifier information of a DRB; length information of a count value of a data packet; and a count value assigned by the second access network device to a next downlink data packet that has not been assigned a count value.

In this design, the second access network device may learn how to assign a count value to a downlink data packet corresponding to the service of the terminal device established in the first access network device.

In a possible design, the transmission status indication information further includes at least one of the following: a count value of the first uplink data packet lost by the first access network device, so that the second access network device can learn of a count value of another lost uplink data packet based on the count value of the lost first uplink data packet; and first indication information used to indicate whether an uplink data packet sent by the terminal device is successfully received by the first access network device, so that the second access network device can learn of a specific uplink data packet that is not successfully received.

In conclusion, the first access network device sends the transmission status indication information to the second access network device, so that the second access network device can learn of a transmission status of an uplink PDCP data packet and/or a downlink PDCP data packet that are/is carried by the DRB of the terminal device established in the first access network device, or learn of a transmission status of an uplink PDCP data packet and/or a downlink PDCP data packet that are/is carried by the first DRB that is of the terminal device established in the first access network device, that is accepted by the second access network device, and that requires data forwarding, so that the service of the terminal device established in the first access network device can be normally continued on the second access network device.

According to a third aspect, an embodiment of this application provides a data transmission method, including the following.

A terminal device sends a re-establishment request message to a second access network device. The second access network device is a corresponding access network device when the terminal device initiates a re-establishment procedure.

The terminal device obtains first reset instruction information from the second access network device. The first reset instruction information is used to instruct to reset a count value of an uplink data packet, and delete a data packet in a first data packet set. The first data packet set is a set of downlink data packets received by the terminal device from a first access network device, or the first data packet set is a set that includes a downlink data packet received by the terminal device from the first access network device and an uplink data packet that has been assigned a count value. The first access network device is a corresponding access network device of the terminal device before the re-establishment procedure.

Based on the first reset instruction information, the terminal device resets the count value of the uplink data packet, and deletes the data packet in the first data packet set.

In this solution, in a scenario in which the second access network device does not support data transmission, the terminal device resets the count value of the uplink data packet, and deletes the data packet in the first data packet set. In this way, after completing the re-establishment with the second access network device, the terminal device newly conducts a service with the second access network device based on the uplink data packet with the reset count value.

According to a fourth aspect, an embodiment of this application provides a data transmission method, including the following.

A second access network device obtains a re-establishment request message from a terminal device.

The second access network device sends first reset instruction information to the terminal device. The first reset instruction information is used to instruct to reset a count value of an uplink data packet, and delete a data packet in a first data packet set. The first data packet set is a set of downlink data packets received by the terminal device from a first access network device, or the first data packet set is a set that includes a downlink data packet received by the terminal device from the first access network device and an uplink data packet that has been assigned a count value.

The second access network device sends second instruction information to the first access network device. The second instruction information is used to instruct the first access network device not to send a data packet to the second access network device.

In this solution, in a scenario in which the second access network device does not support data transmission, based on the first reset instruction information, the terminal device resets the count value of the uplink data packet, and deletes the data packet in the first data packet set. In this way, after completing the re-establishment with the second access network device, the terminal device newly conducts a service with the second access network device based on the uplink data packet with the reset count value.

According to a fifth aspect, an embodiment of this application provides a data transmission method, including the following.

A first access network device obtains second instruction information from a second access network device. The second instruction information is used to instruct the first access network device not to send a data packet to the second access network device.

According to a sixth aspect, an embodiment of this application provides a data transmission method, including the following.

A terminal device determines whether a cell in which a re-establishment request is initiated and a cell whose connection failure is detected by the terminal device are a same cell.

If the cell in which the re-establishment request is initiated and the cell whose connection failure is detected by the terminal device are not the same cell, the terminal device resets a count value of an uplink data packet, and deletes a data packet in a first data packet set. The first data packet set is a set of downlink data packets received by the terminal device, or the first data packet set is a set that includes a downlink data packet received by the terminal device and an uplink data packet that has been assigned a count value.

In this solution, when the terminal device determines that the cell in which the re-establishment request is initiated and the cell whose connection failure is detected by the terminal device are not the same cell, the terminal device resets the count value of the uplink data packet, and deletes the data packet in the first data packet set. In other words, in this case, the terminal considers by default that a second access network device does not support data transmission. In this way, after completing re-establishment with the second access network device, the terminal device newly conducts a service with the second access network device based on the uplink data packet with the reset count value.

According to a seventh aspect, an embodiment of this application provides a data transmission device, including a receiving module and a sending module.

The receiving module is configured to obtain a first message from a second access network device. The first message requests context information of a terminal device.

The sending module is configured to send a data packet to the second access network device.

The data transmission device is a corresponding access network device of the terminal device before a re-establishment procedure, and the second access network device is a corresponding access network device when the terminal device initiates the re-establishment procedure.

In a possible design, the receiving module is further configured to obtain protocol data unit PDU service receiving information from the second access network device. The PDU service receiving information includes identifier information of a first PDU session accepted by the second access network device and/or identifier information of a second PDU session rejected by the second access network device. The first PDU session and the second PDU session are PDU sessions of the terminal device established in the data transmission device.

The sending module is specifically configured to send the data packet based on the PDU service receiving information.

In a possible design, the PDU service receiving information further includes identifier information of a first quality of service QoS flow accepted by the second access network device and/or identifier information of a second QoS flow rejected by the second access network device. The first QoS flow and the second QoS flow are QoS flows corresponding to a service of the terminal device established in the data transmission device.

In a possible design, the PDU service receiving information further includes first information and/or second information.

The first information includes identifier information of a first data radio bearer DRB that requires data forwarding, and an uplink general packet radio service tunneling protocol GTP tunnel address and/or a downlink general packet radio service tunneling protocol GTP tunnel address corresponding to the first DRB. The first DRB is a DRB corresponding to the service between the terminal device and the data transmission device. The second information includes a GTP tunnel address corresponding to the first PDU session.

In a possible design, the sending module is further configured to send transmission status indication information to the second access network device. The transmission status indication information indicates a transmission status of a data packet of the service of the terminal device established in the data transmission device.

The transmission status indication information includes: identifier information of a DRB; length information of a count value of a data packet; and a count value assigned by the second access network device to a next downlink data packet that has not been assigned a count value.

In a possible design, the transmission status indication information further includes at least one of the following: a count value of the first uplink data packet lost by the data transmission device; and first indication information used to indicate whether an uplink data packet sent by the terminal device is successfully received by the data transmission device.

According to an eighth aspect, an embodiment of this application provides a data transmission device, including a receiving module and a sending module.

The sending module is configured to send a first message to a first access network device. The first message requests context information of a terminal device.

The receiving module is configured to receive a data packet from the first access network device.

The first access network device is a corresponding access network device of the terminal device before a re-establishment procedure, and the data transmission device is a corresponding access network device when the terminal device initiates the re-establishment procedure.

In a possible design, the sending module is further configured to send protocol data unit PDU service receiving information to the first access network device. The PDU service receiving information includes identifier information of a first PDU session accepted by the data transmission device and/or identifier information of a second PDU session rejected by the data transmission device. The first PDU session and the second PDU session are PDU sessions of the terminal device established in the first access network device.

In a possible design, the PDU service receiving information further includes identifier information of a first quality of service QoS flow accepted by the data transmission device and/or identifier information of a second QoS flow rejected by the data transmission device. The first QoS flow and the second QoS flow are QoS flows corresponding to a service of the terminal device established in the first access network device.

In a possible design, the PDU service receiving information further includes first information and/or second information.

The first information includes identifier information of a first data radio bearer DRB that requires data forwarding, and an uplink general packet radio service tunneling protocol GTP tunnel address and/or a downlink general packet radio service tunneling protocol GTP tunnel address corresponding to the first DRB. The first DRB is a DRB corresponding to the service of the terminal device established in the first access network device. The second information includes a GTP tunnel address corresponding to the first PDU session.

In a possible design, the receiving module is further configured to obtain transmission status indication information from the first access network device. The transmission status indication information indicates a transmission status of a data packet of the service of the terminal device established in the first access network device.

The transmission status indication information includes: identifier information of a DRB; length information of a count value of a data packet; and a count value assigned by the data transmission device to a next downlink data packet that has not been assigned a count value.

In a possible design, the transmission status indication information further includes at least one of the following: a count value of the first uplink data packet lost by the first access network device; and first indication information used to indicate whether an uplink data packet sent by the terminal device is successfully received by the first access network device.

According to a ninth aspect, an embodiment of this application provides a communications apparatus, including: a module, a component, or a circuit configured to implement the data communication method in the first aspect; a module, a component, or a circuit configured to implement the data communication method in the second aspect; a module, a component, or a circuit configured to implement the data communication method in the third aspect; a module, a component, or a circuit configured to implement the data communication method in the fourth aspect; a module, a component, or a circuit configured to implement the data communication method in the fifth aspect; or a module, a component, or a circuit configured to implement the data communication method in the sixth aspect.

According to a tenth aspect, an embodiment of this application provides a communications apparatus, configured to implement the method according to any one of the first aspect, the second aspect, the third aspect, the fourth aspect, the fifth aspect, or the sixth aspect.

According to an eleventh aspect, an embodiment of this application provides a communications apparatus, configured to implement the method according to any one of the first aspect, the second aspect, the third aspect, the fourth aspect, the fifth aspect, or the sixth aspect.

According to a twelfth aspect, an embodiment of this application provides a readable storage medium. The readable storage medium stores a computer program. When the computer program is executed, the method according to any one of the first aspect, the second aspect, the third aspect, the fourth aspect, the fifth aspect, or the sixth aspect is implemented.

According to a thirteenth aspect, an embodiment of this application provides a program product. The program product includes a computer program. The computer program is stored in a readable storage medium. At least one processor of a communications apparatus may read the computer program from the readable storage medium. The at least one processor executes the computer program, so that the communications apparatus implements the method according to any one of the first aspect, the second aspect, the third aspect, the fourth aspect, the fifth aspect, or the sixth aspect.

DETAILED DESCRIPTION OF ILLUSTRATIVE EMBODIMENTS

Figure 1:
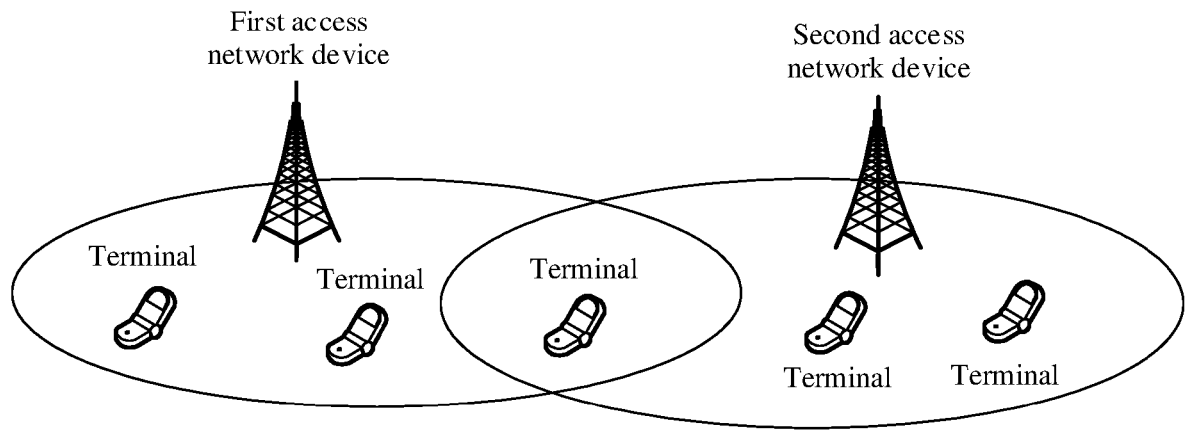
FIG. 1 is a schematic diagram of a communications system according to an embodiment of this application.

FIG. 1 is a schematic diagram of a communications system according to an embodiment of this application. As shown in FIG. 1, the communications system includes a first access network (AN) device, a second access network device, and a terminal device.

In the following, some terms in this application are described, to help a person skilled in the art have a better understanding.

Figure 2:
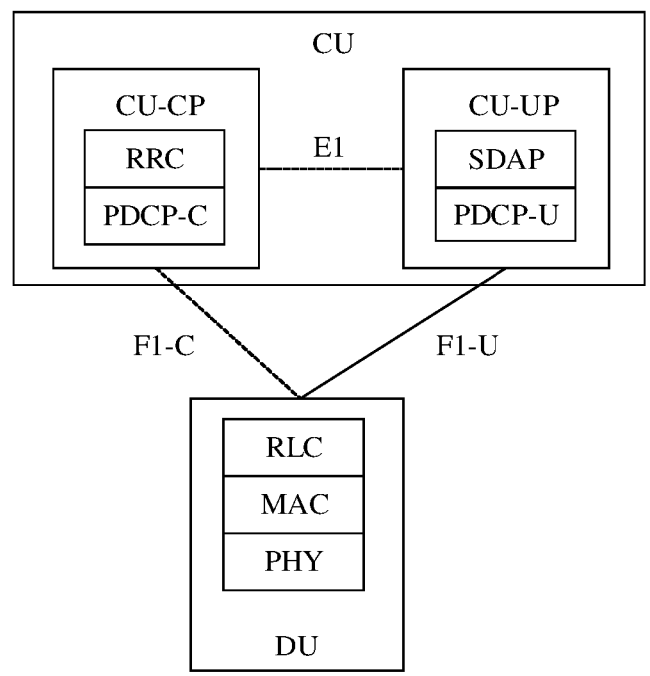
FIG. 2 is a schematic diagram of protocol stacks of a network device according to an embodiment of this application.

An access network device is a device that enables a terminal device to access a wireless network. The access network device may be an evolved NodeB (eNB or eNodeB), a relay station, or an access point in long term evolution (LTE); or a base station in a 5G network, for example, a transmission/reception point (TRP) or a controller. This is not limited herein. In a possible manner, the access network device may be a base station (for example, a gNB) in an architecture in which a CU is separated from a DU. FIG. 2 is a schematic diagram of protocol stacks of a network device according to an embodiment of this application. A RAN device may be connected to a core network device (for example, may be a core network in LTE, or may be a core network in 5G). It may be understood that the CU and the DU are obtained by dividing a base station from an angle of logical functions. The CU and the DU may be physically separated, or may be deployed together. A plurality of DUs may share one CU. One DU may also be connected to a plurality of CUs (not shown in the figure). The CU and the DU may be connected by using an interface, for example, may be connected by using an F1 interface. The CU and the DU may be divided according to protocol layers of a wireless network. For example, functions of a radio resource control (RRC) layer, a service data adaptation protocol (SDAP) layer, and a packet data convergence protocol (PDCP) layer are set in the CU, and functions of a radio link control (RLC) layer, a media access control (MAC) layer, a physical (PHY) layer, and the like are set in the DU. It may be understood that the division on processing functions of the CU and the DU according to protocol layers is merely an example, and the division may be alternatively performed in another manner. For example, functions of more protocol players may be allocated to the CU or the DU through division. For example, alternatively, a part of a processing function of a protocol player may be allocated to the CU or the DU through division. In a design, a part of a function of the RLC layer and a function of a protocol layer above the RLC layer are set in the CU, and remaining functions of the RLC layer and a function of a protocol layer below the RLC layer are set in the DU. In another design, functions of the CU or the DU may be further divided based on a service type or another system requirement. For example, the division is performed based on a delay. A function whose processing time needs to meet a delay requirement is set in the DU, and a function whose processing time does not need to meet the delay requirement is set in the CU. In another design, the CU may also have one or more functions of the core network. The one or more CUs may be disposed together, or disposed separately. For example, the CU may be disposed on a network side to facilitate centralized management. The DU may have a plurality of radio frequency functions. Alternatively, a radio frequency function may be set remotely.

A function of the CU may be implemented by one entity, or may be implemented by different entities. For example, the function of the CU may be further divided. For example, a control plane (CP) is separated from a user plane (UP), that is, a control plane of the CU (CU-CP) and a user plane of the CU (CU-UP). For example, the CU-CP and the CU-UP may be implemented by different function entities, and the CU-CP and the CU-UP may be coupled to the DU to jointly complete functions of the base station. In a possible manner, the CU-CP is responsible for a function of the control plane, and mainly includes RRC and PDCP-C. The PDCP-C is mainly responsible for encryption and decryption, integrity protection, data transmission, and the like of control plane data. The CU-UP is responsible for a function of the user plane, and mainly includes SDAP and PDCP-U. The SDAP is mainly responsible for processing data of the core network and mapping a data flow to a bearer. The PDCP-U is mainly responsible for encryption and decryption, integrity protection, header compression, sequence number maintenance, data transmission, and the like of data plane data. The CU-CP and the CU-UP are connected by using an E1 interface. The CU-CP represents a gNB connected to the core network by using an Ng interface. The CU-CP is connected to the DU by using an F1-C (control plane). The CU-UP is connected to the DU by using an F1-U (user plane). Certainly, another possible implementation is that the PDCP-C is also in the CU-UP.

A terminal device may be a wireless terminal device or a wired terminal device. The wireless terminal device may be a device that has wireless transmission and reception functions. The terminal device may be deployed on land, for example, an indoor device, an outdoor device, a handheld device, or a vehicle-mounted device; or may be deployed on the water (for example, on a ship); or may be deployed in the air (for example, on a plane, a balloon, or a satellite). The terminal device may be a mobile phone, a tablet computer (Pad), a computer having wireless transmission and reception functions, a virtual reality (VR) terminal device, an augmented reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, a wireless terminal device in a smart home, or the like. This is not limited herein. It may be understood that the terminal device in this embodiment of this application may also be referred to as user equipment (UE).

In this patent application, names may be assigned to various types of objects such as messages/information/devices/network elements/systems/apparatuses/actions/operations/processes/concepts. However, these specific names do not constitute a limitation on the related objects. The assigned names may be changed according to a factor such as a scenario, a context, or a usage habit. An understanding of a technical meaning of the related objects is mainly determined from a function and a technical effect that are embodied/executed in the technical solutions.

Due to other reasons such as an RLF, a HOF, an integrity protection check failure, and a reconfiguration failure, a connection between the terminal device and a source access network device may fail. To enable a service between the terminal device and the source access network device to be continued, a connection is re-established between the terminal device and a target access network device. A connection re-establishment procedure may also be referred to as a re-establishment procedure, a resuming process, or a re-activation process. A name of the connection re-establishment procedure is not limited in this embodiment of this application. Herein, the connection between the terminal device and the access network device may be an RRC connection between the terminal device and the access network device. When the target access network device does not store context information of the terminal device, the target access network device needs to perform signaling interworking with the source access network device to obtain the context information of the terminal device. The following uses specific embodiments to describe in detail a method for data transmission between the target access network device and the source access network device after the target access network device requests and obtains the context information of the terminal device from the source access network device when the connection is re-established between the terminal device and the target access network device.

Figure 3:
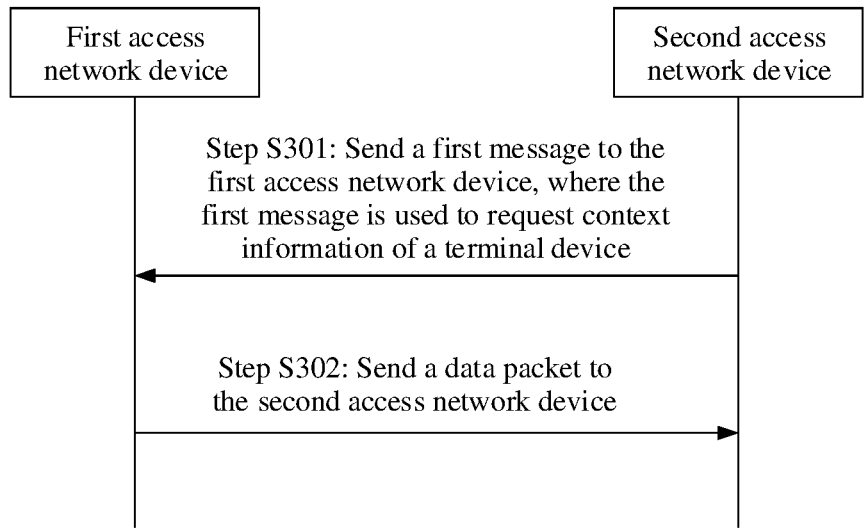
FIG. 3 is a signaling interworking diagram 1 of a data transmission method according to an embodiment of this application.

FIG. 3 is a signaling interworking diagram 1 of a data transmission method according to an embodiment of this application. As shown in FIG. 3, the method in this embodiment may include the following steps.

Step S301: A second access network device sends a first message to a first access network device. The first message requests context information of a terminal device.

Step S302: The first access network device sends a data packet to the second access network device.

Specifically, in this embodiment, the first access network device is a corresponding access network device of the terminal device before a re-establishment procedure, that is, the first access network device is an access network device to which the terminal device fails to be connected. The second access network device is a corresponding access network device when the terminal device initiates a re-establishment procedure after the terminal device is disconnected from the first access network device, that is, an access network device to which the terminal device requests to establish a connection.

For step S301, after the terminal device fails to be connected to the first access network device, the terminal device sends a re-establishment request to the second access network device. After receiving the re-establishment request sent by the terminal device, the second access network device sends the first message to the first access network device. The first message requests the context information of the terminal device.

It may be understood that the first message may be further used by the first access network device to determine that the terminal device initiates the re-establishment request to the second access network device.

For step S302, after receiving the first message sent by the second access network device, the first access network device may learn that the terminal device requests to establish a connection to the second access network device, that is, learn that the terminal device performs the re-establishment procedure. To ensure that a service of the terminal device established in the first access network device can be continued between the terminal device and the second access network device, the first access network device needs to send a data packet of the terminal device established in the first access network device to the second access network device. It may be understood that the first access network device may send the data packet to the second access network device before re-establishment is completed between the terminal device and the second access network device, or after re-establishment is completed between the terminal device and the second access network device. This is not limited in this embodiment.

In this embodiment, the data packet sent by the first access network device to the second access network device may be a packet data convergence protocol (PDCP for short) data packet. The PDCP data packet may be a PDCP protocol data unit (PDU for short) and/or a PDCP service data unit (SDU for short). In this embodiment of this application, the PDCP data packet is used as an example for description. This is not limited in this embodiment of this application.

It may be understood that the data packet sent by the first access network device to the second access network device is a data packet that is of at least a part of the service of the terminal device and that is stored in the first access network device. Specifically, the data packet sent by the first access network device to the second access network device includes at least one of a first data packet, a second data packet, and a third data packet.

The first data packet may be a data packet that is sent by the terminal device and that is successfully received by the first access network device, that is, an uplink data packet that is successfully received by the first access network device. The second data packet may be a data packet that is assigned a count value by the first access network device, that is, a downlink data packet that is assigned a count value by the first access network device (including a downlink data packet that is sent by the first access network device and a downlink data packet that is not sent by the first access network device). Alternatively, the second data packet may be a data packet that is assigned a count value by the first access network device and that is not successfully received by the terminal device, that is, a downlink data packet that is assigned a count value by the first access network device and that is not successfully received by the terminal device (including a downlink data packet that is sent by the first access network device and that is not successfully received by the terminal device, and a downlink data packet that is not sent by the first access network device; or including a downlink data packet that is not sent by the first access network device). The third data packet may be a data packet that is not assigned a count value and that is received by the first access network device from a core network device, that is, a downlink data packet that is not assigned a count value and that is received by the first access network device from the core network device. When the data packet is a PDCP data packet, the count value includes a hyper frame number (HFN for short) and a PDCP sequence number (SN for short). Alternatively, the count value is an SN.

It may be understood that the second access network device may support transmission of all or a part of a data packet of the service of the terminal device established in the first access network device in the re-establishment procedure, to the second access network device.

By using the foregoing procedure in this embodiment, data transmission between the first access network device and the second access network device is implemented in the re-establishment procedure. In this way, after the re-establishment is completed between the terminal device and the second access network device, service transmission may be performed between the terminal device and the second access network device.

The following uses a specific embodiment to describe in detail the method in the foregoing embodiment.

Figure 4:
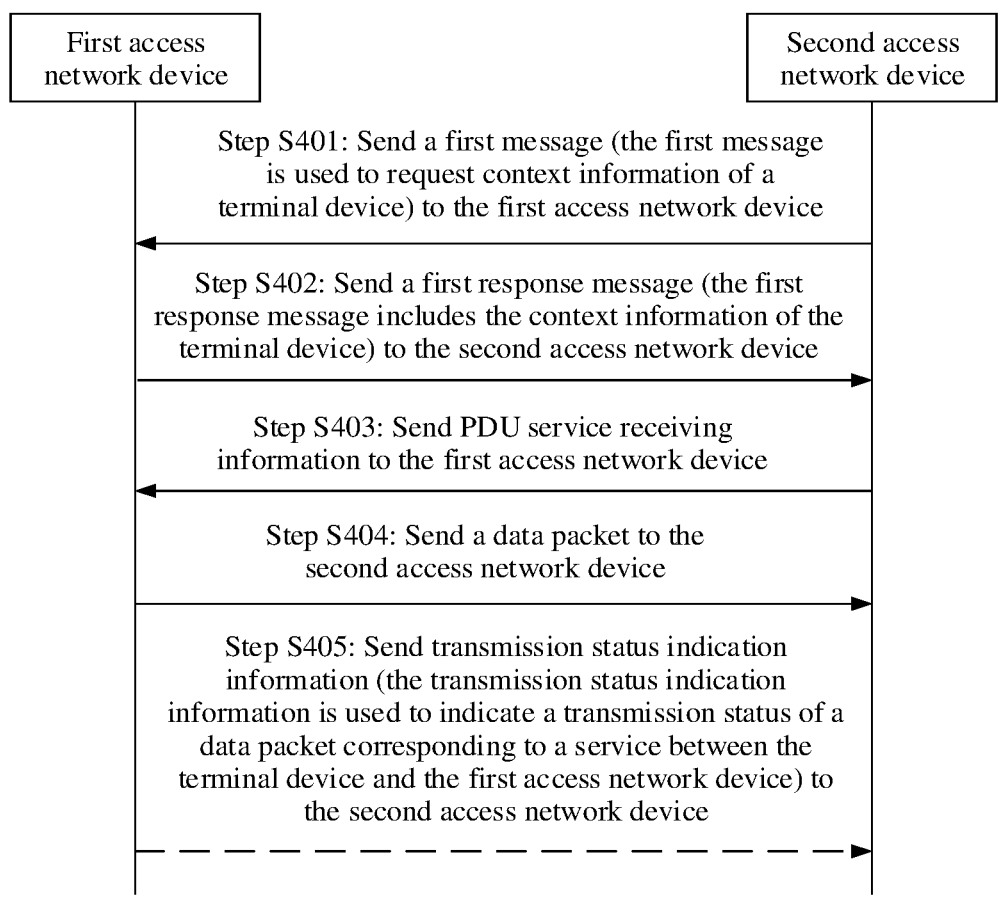
FIG. 4 is a signaling interworking diagram 2 of a data transmission method according to an embodiment of this application.

FIG. 4 is a signaling interworking diagram 2 of a data transmission method according to an embodiment of this application. As shown in FIG. 4, the method in this embodiment may include the following steps.

Step S401: A second access network device sends a first message to a first access network device. The first message requests context information of a terminal device.

Step S402: The first access network device sends a first response message to the second access network device. The first response message includes the context information of the terminal device.

Step S403: The second access network device sends PDU service receiving information to the first access network device.

Step S404: The first access network device sends a data packet to the second access network device.

Optionally, the method may further include step S405: The first access network device sends transmission status indication information to the second access network device. The transmission status indication information indicates a transmission status of a data packet corresponding to a service of the terminal device established in the first access network device.

Specifically, for specific implementation of step S401 in this embodiment, refer to step S301 in the foregoing embodiment. Details are not described in this embodiment again.

For step S402, after the first access network device receives the first message that is sent by the second access network device and that requests the context information of the terminal device, the first access network device sends the first response message to the second access network device.

In an optional manner, the first response message carries the context information of the terminal device. The context information of the terminal device includes PDU session resource information of the terminal device established in the first access network device. The PDU session resource information may include the following information: an identifier of a PDU session and an identifier of a quality of service (QoS) flow corresponding to the PDU session. Further, the PDU session resource information may further include a mapping relationship between an identifier of a DRB and an identifier of a QoS flow.

Each PDU session corresponds to at least one DRB. Each DRB may carry an uplink data packet and/or a downlink data packet. Each DRB corresponds to at least one QoS flow.

For step S403, the second access network device may send the PDU service receiving information to the first access network device based on the PDU session resource information in the context information of the terminal device.

Specifically, the second access network device receives the first response message sent by the first access network device, and sends the PDU service receiving information to the first access network device based on the PDU session resource information in the context information of the terminal device in the first response message. In other words, the second access network device determines, based on the PDU session resource information of the terminal device established in the first access network device, a specific PDU session that can be accepted or rejected of the terminal device established in the first access network device, and/or a specific QoS flow that can be accepted or rejected, and/or a specific DRB whose carried data needs to be forwarded, of the terminal device established in the first access network device. Further, the second access network device further determines a general packet radio service tunneling protocol (GTP for short) tunnel address corresponding to the accepted PDU session, and/or an uplink GTP tunnel address and/or a downlink GTP tunnel address corresponding to the DRB that requires data forwarding. The GTP tunnel address includes an IP address and/or an endpoint identifier of a GTP tunnel. Specifically, the IP address may be a transport layer address (TLA for short), and the endpoint identifier may be a GTP tunnel endpoint identifier (GTP-TEID for short).

In other words, the PDU service receiving information may include either one of the following: identifier information of a first PDU session accepted by the second access network device, or identifier information of a second PDU session rejected by the second access network device. The first PDU session and the second PDU session are PDU sessions of the terminal device established in the first access network device. There is at least one first PDU session. There may be 0 second PDU sessions, or there may be at least one second PDU session.

Optionally, the PDU service receiving information may further include second information. The second information includes a GTP tunnel address corresponding to the first PDU session.

Optionally, the PDU service receiving information may further include at least one of the following information: identifier information of a first QoS flow accepted by the second access network device, identifier information of a second QoS flow rejected by the second access network device, and corresponding data forwarding accept indication information. The data forwarding accept indication information indicates acceptance of forwarding of data of the first QoS flow and identifier information of a second QoS flow rejected by the second access network device. The first QoS flow and the second QoS flow are QoS flows of the service of the terminal device established in the first access network device. Optionally, there is at least one first QoS flow. There may be 0 second QoS flows, or there may be at least one second QoS flow.

In an implementation, the first QoS flow is a QoS flow corresponding to the first PDU session. If the second QoS flow exists, the second QoS flow is also a QoS flow corresponding to the first PDU session.

Optionally, the PDU service receiving information may further include first information. The first information includes identifier information of a first DRB that requires data forwarding. Further, the first information further includes an uplink GTP tunnel address and/or a downlink GTP tunnel address corresponding to the first DRB. The first DRB is a DRB corresponding to the service of the terminal device established in the first access network device.

An example of a specific embodiment is shown below. The service of the terminal device established in the first access network device corresponds to a PDU session 1 and a PDU session 2. The PDU session 1 includes a QoS flow 1 and a QoS flow 2. A mapping relationship exists between the QoS flow 1 and a DRB 1. The PDU session 2 includes a QoS flow 3. The second access network device determines that the PDU session 1 can be accepted, the QoS flow 1 of the PDU session 1 can be accepted, the QoS flow 2 of the PDU session 1 is rejected, and data forwarding of the QoS flow 1 is accepted. In this case, the PDU service receiving information in a second message may include identifier information (for example, 1) of the accepted PDU session 1, identifier information (for example, 1) of the accepted QoS flow 1, data forwarding accept indication information (for example, "data forwarding accepted") of the QoS flow 1, identifier information (for example, 2) of the QoS flow 2, an uplink GTP tunnel address and/or a downlink GTP tunnel address corresponding to the DRB 1, and identifier information 2 (for example, 2) of the rejected PDU session 2.

Corresponding to the foregoing example, information elements included in the PDU service receiving information are shown in Table 1.

TABLE 1

| Name of an information element | Value |
|---|---|
| List of accepted PDU session resources (PDU Session Resources Admitted List) | |
| >Accepted PDU session resource item (PDU Session Resources Admitted Item IEs) | |
| >>Identifier information of a PDU resource (PDU Session ID) | 1 |
| >>List of accepted QoS flows (QoS Flows Admitted List) | |
| >>>Accepted QoS flow item (QoS Flows Admitted Item IEs) | |
| >>>>Identifier information of a QoS flow (QoS Flow Indicator) | 1 |
| >>>>Data forwarding accept indication information (Data Forwarding Accepted) | Data forwarding accepted (data forwarding accepted) |
| >>List of accepted QoS flows (QoS Flows Admitted List) | |
| >>>Rejected QoS flow item (QoS Flows not Admitted Item IEs) | |
| >>>>Identifier information of a QoS flow (QoS Flow Indicator) | 2 |
| >>Data forwarding information of a second access network device (Data Forwarding Info from target NG-RAN node) | |
| >>>Identifier information of a DRB (DRB ID) | 1 |
| >>>Downlink GTP tunnel address information (DL Forwarding UP TNL Information) | |

TABLE 1-continued

| Name of an information element | Value |
| --- | --- |
| >>>Uplink GTP tunnel address information (UL Forwarding UP TNL Information) | |
| List of rejected PDU session resources (PDU Session Resources Not Admitted List) | |
| >>Rejected PDU session resource item (PDU Session Resources Not Admitted Item IEs) | |
| >>Identifier information of a PDU resource (PDU Session ID) | 2 |

Optionally, the PDU service receiving information may further include a reason for rejecting the second PDU session. The reason for rejecting the second PDU session may be that a target cell (a cell in which the terminal device is located and that corresponds to the second access network device) has no resource, or a target cell does not support the second PDU session, or the like.

Optionally, the PDU service receiving information may further indicate a reason for rejecting the second QoS flow. The reason for rejecting the second QoS flow may be that a target cell has no resource, or a target cell does not support the second QoS flow, or the like. That the target cell does not support the second QoS flow means that the target cell cannot meet a condition corresponding to a QoS flow parameter corresponding to the second QoS flow. The QoS flow parameter may include at least one of the following: a priority, a packet delay plan, a packet error rate, a time delay sensitivity indication, an average window, or a maximum data packet burst.

In a possible manner, the PDU service receiving information may be carried in a data forwarding address indication message, for example, a DATA FORWARDING ADDRESS INDICATION message; or may be carried in another message; or may be an independent message.

For step S404, in an implementation, that the first access network device sends the data packet to the second access network device includes: The first access network device sends the data packet to the second access network device based on the received PDU service receiving information.

Specifically, after receiving the PDU service receiving information, the first access network device sends, to the second access network device based on the PDU service receiving information, the data packet corresponding to the PDU session accepted by the second access network device and/or the QoS flow accepted by the second access network device. Specifically, the first access network device sends, to the second access network device based on the GTP tunnel address that corresponds to the PDU session and that is in the PDU service receiving information, a data packet corresponding to the PDU session accepted by the second access network device; and/or the first access network device sends, to the second access network device based on the GTP tunnel address that corresponds to the PDU session and that is in the PDU service receiving information and/or the uplink GTP tunnel address and/or the downlink GTP tunnel address corresponding to the DRB, a data packet that is carried by a corresponding DRB corresponding to the QoS flow accepted by the second access network device.

For step S405, the first access network device sends the transmission status indication information to the second access network device. The transmission status indication information indicates a transmission status of a data packet corresponding to the service of the terminal device established in the first access network device. In an implementation, the transmission status indication information indicates a transmission status of an uplink PDCP data packet and/or a downlink PDCP data packet that are/is carried by the DRB of the terminal device established in the first access network device. Further, the transmission status indication information indicates the transmission status of the uplink PDCP data packet and/or the downlink PDCP data packet that are/is carried by the first DRB that is of the terminal device established in the first access network device, that is accepted by the second access network device, and that requires data forwarding.

Specifically, a set of all first data packets is a subset of a set including all uplink data packets corresponding to the service of the terminal device established in the first access network device. A set including all second data packets and all third data packets is a subset of a set including all downlink data packets corresponding to the service of the terminal device established in the first access network device. For meanings of the first data packet, the second data packet, and the third data packet in this embodiment, refer to descriptions in the embodiment shown in FIG. 3.

In an implementation, the transmission status indication information is a separate message, for example, a sequence number status transfer (SN STATUS TRANSFER) message. The transmission status indication information is sent by the first access network device to the second access network device. In this case, the transmission status indication information may be sent after the first access network device receives the PDU service receiving information. In another implementation, the transmission status indication information may be alternatively included in the first response message in step S402. In other words, step S405 does not need to be performed. In this case, the transmission status indication information is sent before the first access network device receives the PDU service receiving information.

The transmission status indication information may include identifier information of a DRB, length information of a count value of a data packet, and a count value assigned by the second access network device to a next downlink data packet that has not been assigned a count value, that is, a count value assigned by the second access network device to a beginning third data packet.

Optionally, the transmission status indication information may further include a count value of the first uplink data packet lost by the first access network device. The first uplink data packet lost by the first access network device is a first uplink data packet that is not successfully received by the first access network device. The second access network device may learn of, based on the count value that is of the first data packet lost by the first access network device and that is in the uplink data packet carried by the DRB, a count value that is of another data packet lost by the first access network device and that is in the uplink data packet carried by the DRB.

Optionally, the transmission status indication information may further include first indication information used to indicate whether an uplink data packet sent by the terminal device is successfully received by the first access network device. The first indication information may be a bit string. In an implementation, a first bit indicates whether a first data packet after the first uplink data packet lost by the first access network device in the uplink data packet carried by the DRB is successfully received by the first access network device.

The second access network device may learn, based on the first indication information, whether the uplink data packet is successfully received by the first access network device.

It may be understood that, if the transmission status indication information is sent after the first access network device receives the PDU service receiving information, the transmission status indication information may be used to indicate the transmission status of the uplink data packet and/or the downlink data packet that are/is carried by the first DRB that is of the terminal device established in the first access network device, that is accepted by the second access network device, and that requires data forwarding. Specifically, the "identifier information of a DRB" is the identifier information of the first DRB. Further, the "length information of a count value of a data packet" is length information of the count value of the uplink data packet and/or the downlink data packet carried by the first DRB; the "count value assigned by the second access network device to a next downlink data packet that has not been assigned a count value" is a count value assigned by the second access network device to the next downlink data packet that is carried by the first DRB and that is not assigned a count value; the "count value of the first uplink data packet lost by the first access network device" is a count value of the first uplink data packet lost by the first access network device in the uplink data packet carried by the first DRB; and the first indication information indicates whether the uplink data packet carried by the first DRB is successfully received by the first access network device.

If the transmission status indication information is sent before the first access network device receives the PDU service receiving information, the transmission status indication information may include a transmission status of an uplink data packet and/or a downlink data packet that are/is carried by all DRBs of the terminal device established in the first access network device. For specific content, refer to the foregoing description. Details are not described again.

In conclusion, the first access network device sends the transmission status indication information to the second access network device, so that the service of the terminal device established in the first access network device can be normally continued on the second access network device.

In this embodiment, because the first access network device sends the data packet to the second access network device based on the PDU service receiving information of the second access network device, a quantity of times that the first access network device sends the data packet rejected by the second access network device to the second access network device can be minimized, thereby reducing signaling overheads.

It should be understood that, sequence numbers of the foregoing processes do not mean execution sequences (for example, step S405 may be performed before step S404), and do not mean that the steps corresponding to the sequence numbers of the foregoing processes need to be performed. The execution sequences of the processes should be determined based on functions and internal logic of the processes, and should not be construed as any limitation on the implementation processes of this embodiment of this application.

Figure 5:
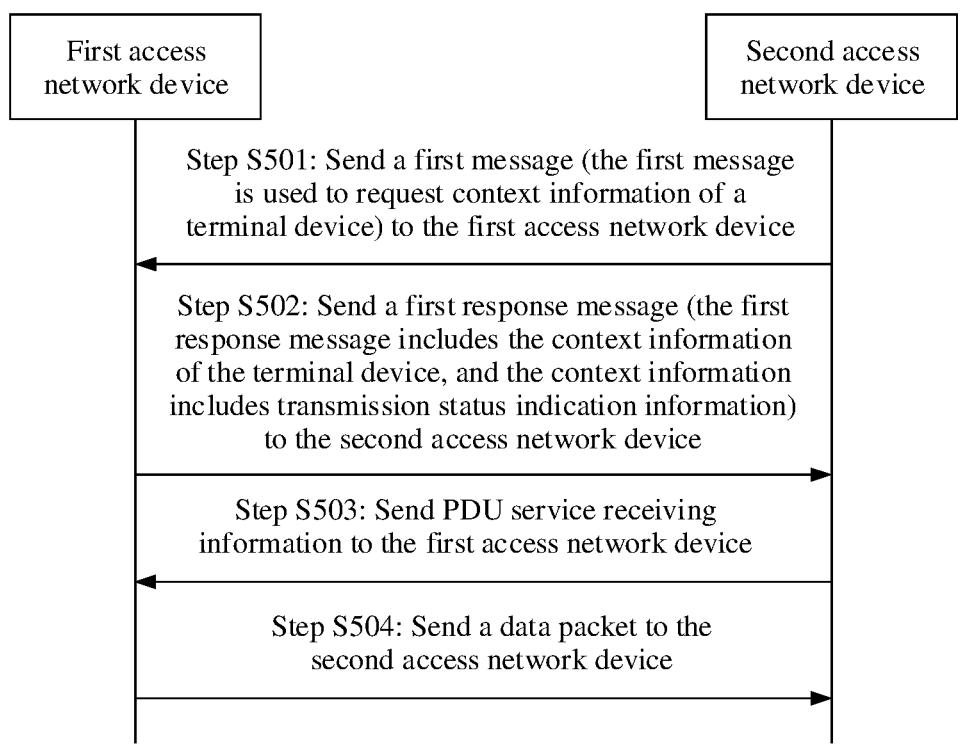
FIG. 5 is a signaling interworking diagram 3 of a data transmission method according to an embodiment of this application.

The following describes a data transmission method in which the transmission status indication information in the embodiment shown in FIG. 4 is carried in the first response message. FIG. 5 is a signaling interworking diagram 3 of a data transmission method according to an embodiment of this application. As shown in FIG. 5, the method in this embodiment may include the following steps.

Step S501: A second access network device sends a first message to a first access network device. The first message requests context information of a terminal device.

Step S502: The first access network device sends a first response message to the second access network device. The first response message includes the context information of the terminal device. The context information includes PDU session resource information and transmission status indication information of the terminal device established in the first access network device. For a description of the transmission status indication information, refer to a description of step S405. Details are not described herein again.

Step S503: The second access network device sends PDU service receiving information to the first access network device.

Step S504: The first access network device sends a PDCP data packet to the second access network device.

Specifically, for step S501, step S503, and step 504 in this embodiment, respectively refer to descriptions of step S401, step S403, and step S404 in the embodiment shown in FIG. 4. Details are not described in this embodiment again.

For step S502, refer to descriptions of step S402 and step S405 in the embodiment shown in FIG. 4. Details are not described in this embodiment again.

In this embodiment, because the first access network device sends the data packet to the second access network device based on the PDU service receiving information of the second access network device, a quantity of times that the first access network device sends the data packet rejected by the second access network device to the second access network device can be minimized, thereby reducing signaling overheads.

It should be understood that, sequence numbers of the foregoing processes do not mean execution sequences, and do not mean that the steps corresponding to the sequence numbers of the foregoing processes need to be performed. The execution sequences of the processes should be determined based on functions and internal logic of the processes, and should not be construed as any limitation on the implementation processes of this embodiment of this application.

Figure 6:
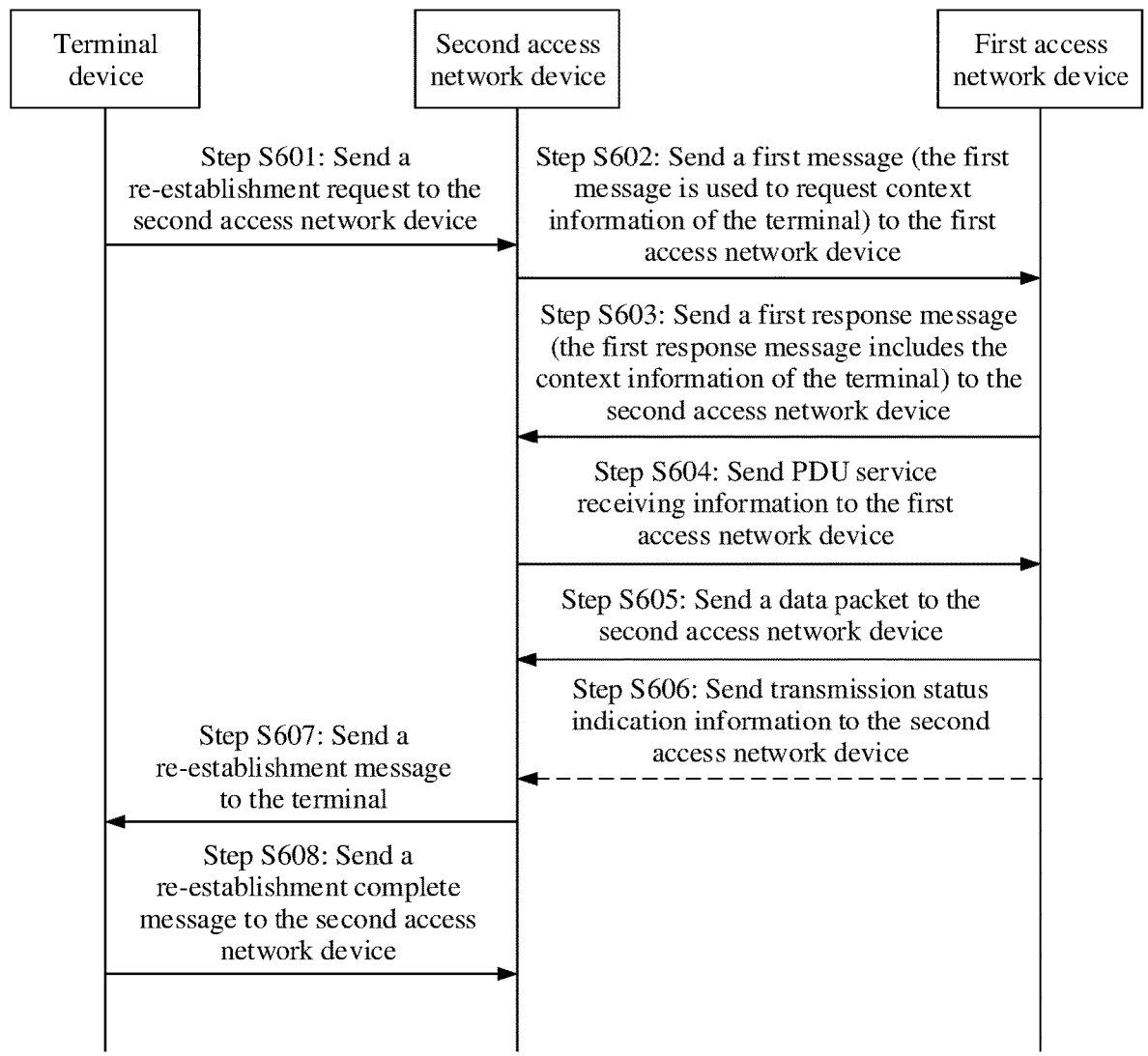
FIG. 6 is a signaling interworking diagram 4 of a data transmission method according to an embodiment of this application.

FIG. 6 is a signaling interworking diagram 4 of a data transmission method according to an embodiment of this application. As shown in FIG. 6, the method in this embodiment may include the following steps.

Step S601: A terminal device sends a re-establishment request to a second access network device.

Specifically, after the terminal device is disconnected from a first access network device, the terminal device sends the re-establishment request to the second access network device.

Step S602: The second access network device sends a first message to the first access network device. The first message requests context information of the terminal device.

In this embodiment, the first message may be a terminal device context obtaining request (RETRIEVE UE CONTEXT REQUEST) message.

Step S603: The first access network device sends a first response message to the second access network device.

The first response message includes the context information of the terminal device. The context information of the terminal device includes PDU session resource information of the terminal device established in the first access network device.

In this embodiment, the first response message may be a terminal device context obtaining response (RETRIEVE UE CONTEXT RESPONSE) message.

Step S604: The second access network device sends PDU service receiving information to the first access network device.

Specifically, the second access network device sends the PDU service receiving information of the second access network device to the first access network device based on the PDU session resource information of the terminal device established in the first access network device.

In this embodiment, the PDU service receiving information may be carried in a data forwarding address indication (DATA FORWARDING ADDRESS INDICATION) message, or may be a separate message.

Step S605: The first access network device sends a data packet to the second access network device.

Specifically, the first access network device sends the data packet to the second access network device based on the PDU service receiving information.

Step S606: The first access network device sends transmission status indication information to the second access network device. The transmission status indication information indicates a transmission status of a data packet corresponding to a service of the terminal device established in the first access network device.

The transmission status indication information may be a sequence number status transfer (SN STATUS TRANSFER) message. The transmission status indication information may be alternatively carried in the first response message. In this case, step S606 no longer exists.

Step S607: The second access network device sends a re-establishment message to the terminal device.

Step S608: The terminal device sends a re-establishment complete message to the second access network device.

Specifically, in this embodiment, the first access network device is a corresponding access network device of the terminal device before a re-establishment procedure, and the second access network device is a corresponding access network device when the terminal device initiates the re-establishment procedure after the terminal device is disconnected from the first access network device, that is, an access network device to which the terminal device requests to establish a connection.

For step S602 to step S606 in this embodiment, refer to a description in the implementation shown in FIG. 4. Details are not described in this embodiment again.

It should be understood that, sequence numbers of the foregoing processes do not mean execution sequences (for example, execution sequences of a process between a terminal device and an access network device and a process between access network devices are not limited), and do not mean that the steps corresponding to the sequence numbers of the foregoing processes need to be performed. The execution sequences of the processes should be determined based on functions and internal logic of the processes, and should not be construed as any limitation on the implementation processes of this embodiment of this application.

In this embodiment, data transmission between the first access network device and the second access network device in the re-establishment procedure of obtaining the context information of the terminal device is implemented. In addition, the first access network device sends the data packet to the second access network device based on the PDU service receiving information of the second access network device. Therefore, a quantity of times that the first access network device sends a data packet rejected by the second access network device to the second access network device can be minimized, thereby reducing signaling overheads.

The following describes a data transmission method in a case in which the second access network device does not support the re-establishment procedure, for example, in a scenario in which the second access network device has straining resources, or the second access network device does not have a related capability.

Figure 7:
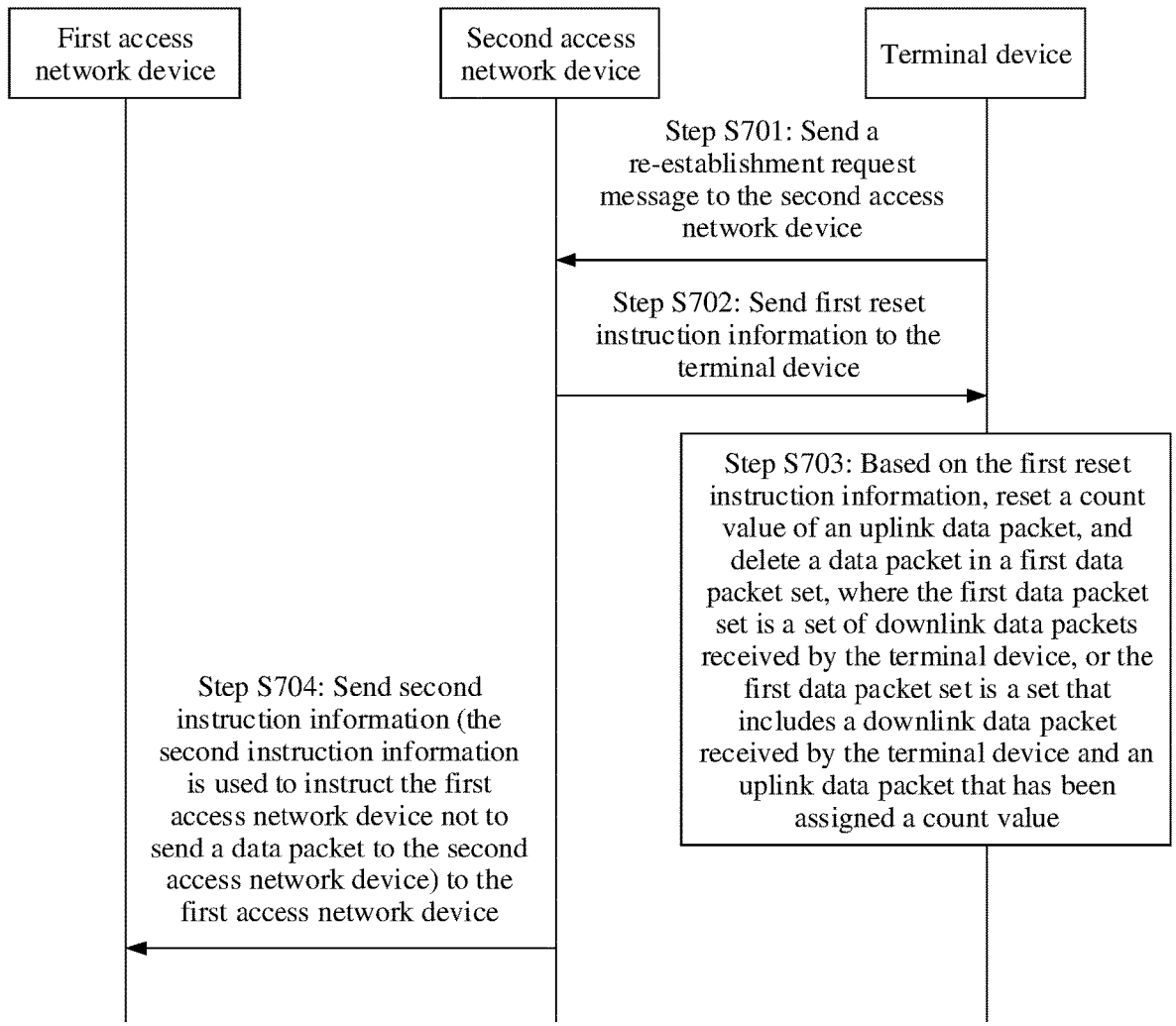
FIG. 7 is a signaling interworking diagram 5 of a data transmission method according to an embodiment of this application.

FIG. 7 is a signaling interworking diagram 5 of a data transmission method according to an embodiment of this application. As shown in FIG. 7, the method in this embodiment may include the following steps.

Step S701: A terminal device sends a re-establishment request message to a second access network device. When the terminal device is disconnected from a first access network device, the terminal device sends the re-establishment request message to the second access network device.

Step S702: The second access network device sends first reset instruction information to the terminal device. The first reset instruction information is used to instruct to reset a count value of an uplink data packet, and delete a data packet in a first data packet set. The first data packet set is a set of downlink data packets received by the terminal device from the first access network device, or the first data packet set is a set that includes a downlink data packet received by the terminal device from the first access network device and an uplink data packet that has been assigned a count value. The first access network device is a corresponding access network device of the terminal device before a re-establishment procedure.

Specifically, in an implementation, the first reset instruction information may be carried in a re-establishment message sent by the second access network device to the terminal device. In this implementation, an execution sequence of step S701 is before that of step S702.

In another implementation, the first reset instruction information is carried in a system message broadcast by the second access network device. It may be understood that, in this implementation, an execution sequence of step S702 is before that of step S701.

In another implementation, the first reset instruction information is sent by the second access network device to the terminal device based on a request that requests sending of reset instruction information and that is sent by the terminal device.

Step S703: Based on the first reset instruction information, the terminal device resets the count value of the uplink data packet, and deletes the data packet in the first data packet set.

The first reset instruction information is also used to indicate to the terminal device that the second access network device does not support data forwarding of the first access network device.

It may be understood that in the embodiments shown in FIG. 4 to FIG. 6, the terminal device may receive second reset instruction information. The second reset instruction information indicates that the terminal device does not need to reset the count value of the uplink data packet, and does not need to delete the data packet in the first data packet set. Alternatively, the second reset instruction information is also used to indicate to the terminal device that the second access network device supports the data forwarding of the first access network device.

Step S704: The second access network device sends second instruction information to the first access network device. The second instruction information is used to instruct the first access network device not to send a data packet to the second access network device.

In other words, if the second access network device sends the first reset instruction information to the terminal device, the second access network device further sends the second instruction information to the first access network device. The first access network device does not send the data packet to the second access network device after receiving the second instruction information.

In this embodiment, in a scenario in which the second access network device does not support data transmission, the terminal device resets the count value of the uplink data packet, and deletes the data packet in the first data packet set. In this way, after completing the re-establishment with the second access network device, the terminal device newly conducts a service with the second access network device based on the uplink data packet with the reset count value.

It should also be understood that, sequence numbers of the foregoing processes do not mean execution sequences. The execution sequences of the processes should be determined based on functions and internal logic of the processes (for example, step S701 may be performed before step S702, or step S701 may be performed after step S702), and should not be construed as any limitation on the implementation processes of this embodiment of this application.

The following describes another data transmission method in a case in which the second access network device does not support the re-establishment procedure.

Figure 8:
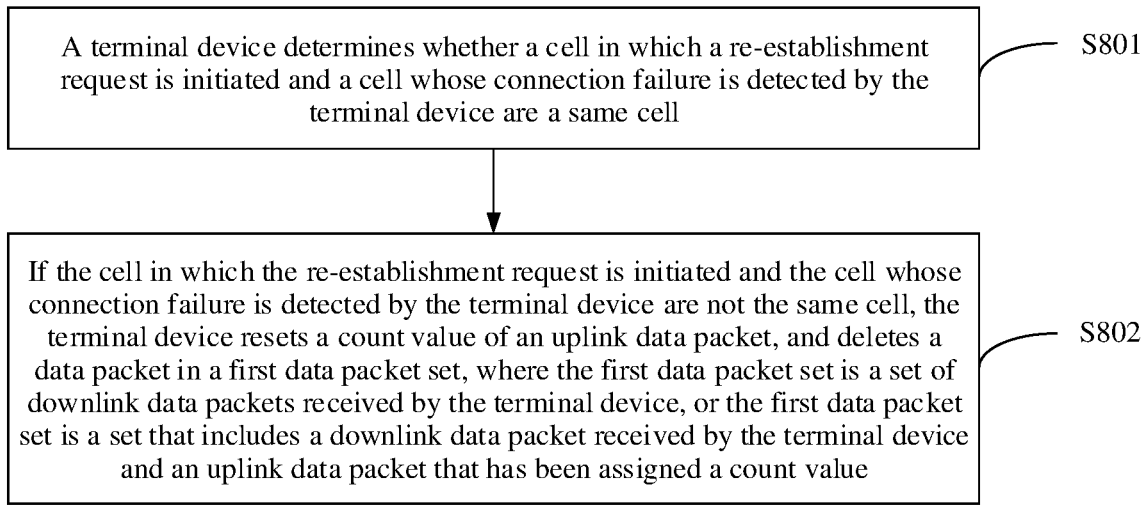
FIG. 8 is a signaling interworking diagram 6 of a data transmission method according to an embodiment of this application.

FIG. 8 is a signaling interworking diagram 6 of a method according to an embodiment of this application. Referring to FIG. 8, the method in this embodiment may include the following steps.

Step S801: A terminal device determines whether a cell in which a re-establishment request is initiated and a cell whose connection failure is detected by the terminal device are a same cell.

Step S802: If the cell in which the re-establishment request is initiated and the cell whose connection failure is detected by the terminal device are not the same cell, the terminal device resets a count value of an uplink data packet, and deletes a data packet in a first data packet set. The first data packet set is a set of downlink data packets received by the terminal device, or the first data packet set is a set that includes a downlink data packet received by the terminal device and an uplink data packet that has been assigned a count value.

Specifically, a difference between this embodiment and the embodiment shown in FIG. 7 is that the terminal device considers by default that the second access network device does not support data transmission in a re-establishment procedure, and the terminal device resets the count value of the uplink data packet and deletes the data packet in the first data packet set once the terminal device detects that the cell in which the re-establishment procedure is initiated is different from a previous serving cell.

In this embodiment, in a scenario in which the second access network device does not support data transmission, the terminal device resets the count value of the uplink data packet, and deletes the data packet in the first data packet set. In this way, after completing the re-establishment with the second access network device, the terminal device newly conducts a service with the second access network device based on the uplink data packet with the reset count value.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

It may be understood that, in the foregoing embodiments, the method implemented by the first access network device may also be implemented by a component (such as a chip or a circuit) that may be used in the first access network device. In the foregoing embodiments, the method implemented by the second access network device may also be implemented by a component (such as a chip or a circuit) that may be used in the second access network device. In the foregoing embodiments, the method implemented by the terminal device may also be implemented by a component (such as a chip or a circuit) that may be used in the terminal device.

Figure 9:
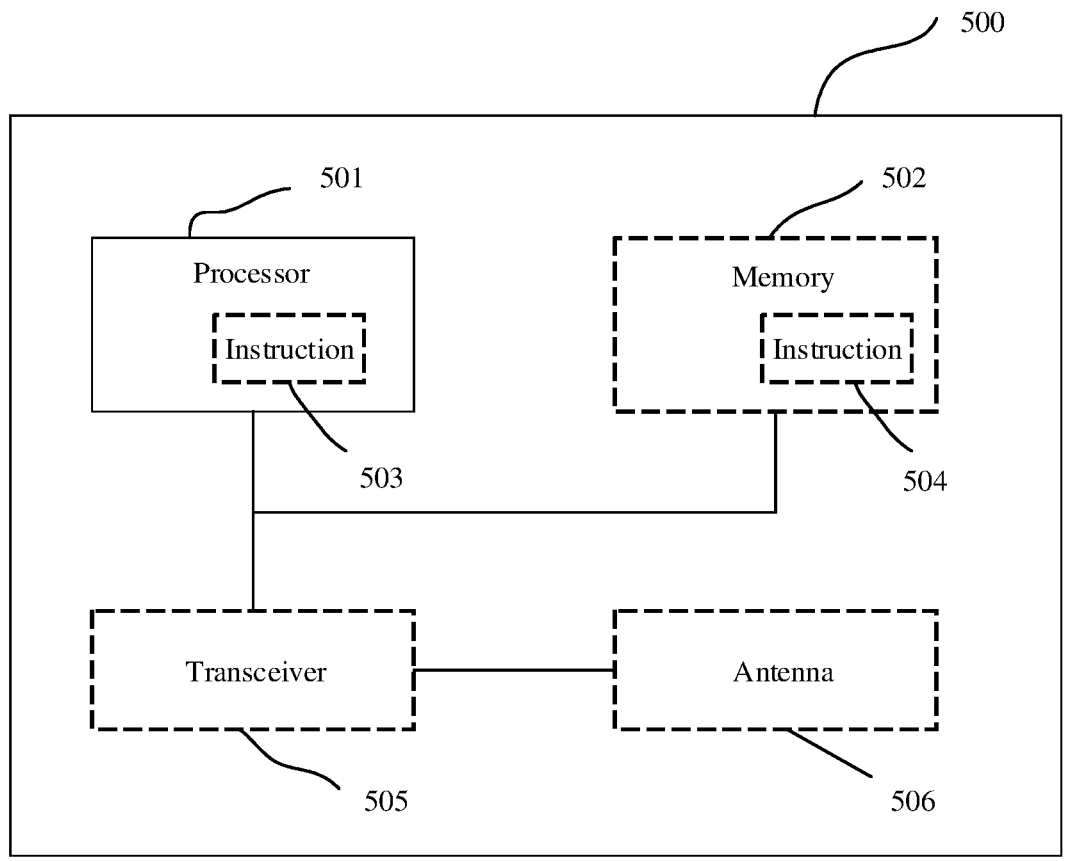
FIG. 9 is a schematic structural diagram 1 of a communications apparatus according to an embodiment of this application.

FIG. 9 is a schematic structural diagram 1 of a communications apparatus according to an embodiment of this application. As shown in FIG. 9, the communications apparatus 500 shown in this embodiment may be the first access network device (or a component that may be used in the first access network device), the second access network device (or a component that may be used in the second access network device), or the terminal device (or a component that may be used in the terminal device) mentioned in the foregoing method embodiments. The communications apparatus 500 may be configured to implement the method corresponding to the terminal device, the first access network device, or the second access network device described in the foregoing method embodiments. For details, refer to a description in the foregoing method embodiments.

The communications apparatus 500 may include one or more processors 501. The processor 501 may also be referred to as a processing unit, and can implement a specific control or processing function. The processor 501 may be a general-purpose processor, a dedicated processor, or the like. For example, the processor 501 may be a baseband processor or a central processing unit. The baseband processor may be configured to process a communications protocol and communication data. The central processing unit may be configured to: control the communications apparatus, execute a software program, and process data of the software program.

In an optional design, the processor 501 may also store an instruction 503 or data (for example, intermediate data). The instruction 503 may be run by the processor, so that the communications apparatus 500 performs the method corresponding to the terminal device, the first access network device, or the second access network device described in the foregoing method embodiments.

In another possible design, the communications apparatus 500 may include a circuit. The circuit may implement a sending, receiving, or communication function in the foregoing method embodiments.

Optionally, the communications apparatus 500 may include one or more memories 502. The one or more memories 502 store an instruction 504. The instruction may be run on the processor, so that the communications apparatus 500 performs the methods described in the foregoing method embodiments.

Optionally, the memory may alternatively store data. The processor and the memory may be disposed separately, or may be integrated together.

Optionally, the communications apparatus 500 may further include a transceiver 505 and/or an antenna 506. The processor 501 may be referred to as a processing unit, and controls the communications apparatus (a terminal device or a network device). The transceiver 505 may be referred to as a transceiver unit, or a transceiver circuit, and is configured to implement a sending/receiving function of the communications apparatus.

For a specific implementation process of the transceiver 505 and the processor 501, refer to a related description in the foregoing embodiments. Details are not described herein again.

The processor 501 and the transceiver 505 described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor and the transceiver may also be manufactured by using various IC processing technologies, for example, a complementary metal-oxide-semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs).

In the description of the foregoing embodiment, the communications apparatus 500 is described by using the terminal device or the network device as an example. However, a scope of the communications apparatus described in this application is not limited to the terminal device or the network device, and a structure of the communications apparatus may not be limited by FIG. 5. The communications apparatus 500 may be an independent device, or may be a part of a relatively large device. For example, the device may be:

(1) an independent integrated circuit IC, chip, chip system, or chip subsystem;

(2) a set including one or more ICs, where optionally, the IC set may also include a storage component configured to store data and/or an instruction;

(3) an ASIC, for example, a modem;

(4) a module that can be built in another device;

(5) a receiver, a terminal device, a cellular phone, a wireless device, a handset, a mobile unit, a network device, or the like; or (6) another device or the like.

Figure 10:
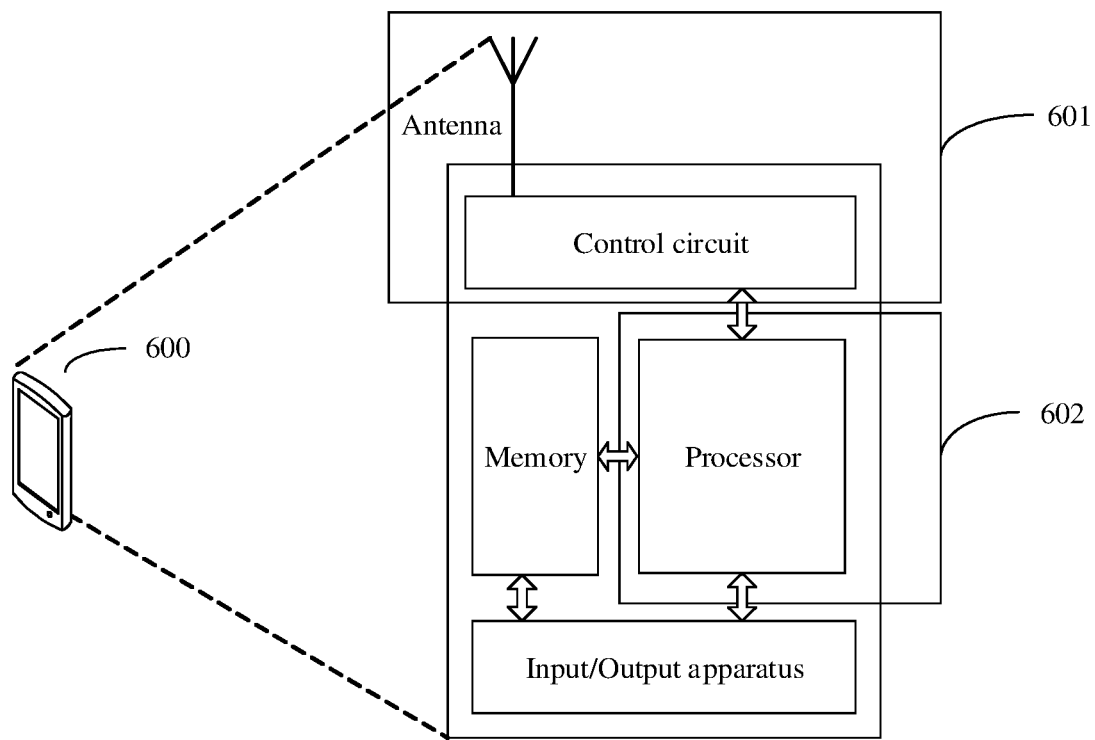
FIG. 10 is a schematic structural diagram of a terminal device according to an embodiment of this application.

FIG. 10 is a schematic structural diagram of a terminal device according to an embodiment of this application. The terminal device may be used as the terminal device in the foregoing embodiments of this application. For ease of description, FIG. 10 shows merely main parts of the terminal device. As shown in FIG. 10, the terminal device 600 includes a processor, a memory, a control circuit, an antenna, and an input/output apparatus. The processor is mainly configured to: process a communications protocol and communication data, control the entire terminal device, execute a software program, and process data of the software program. The memory is mainly configured to store a software program and data. The radio frequency circuit is mainly configured to: perform conversion between a baseband signal and a radio frequency signal, and process a radio frequency signal. The antenna is mainly configured to receive and send a radio frequency signal in an electromagnetic wave form. The input/output apparatus such as a touchscreen, a display screen, or a keyboard is mainly configured to: receive data entered by a user, and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor; and the processor converts the baseband signal into data, and processes the data.

A person skilled in the art may understand that for ease of description, FIG. 10 shows only one memory and one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data. The central processing unit is mainly configured to: control the entire terminal device, execute a software program, and process data of the software program. The processor in FIG. 10 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and various parts of the terminal device may be connected by using various buses. The baseband processor may also be expressed as a baseband processing circuit or a baseband processing chip. The central processing unit may also be expressed as a central processing circuit or a central processing chip. A function of processing a communications protocol and communication data may be embedded into the processor, or may be stored in a storage unit in a form of a software program, so that the processor executes the software program to implement a baseband processing function.

Figure 11:
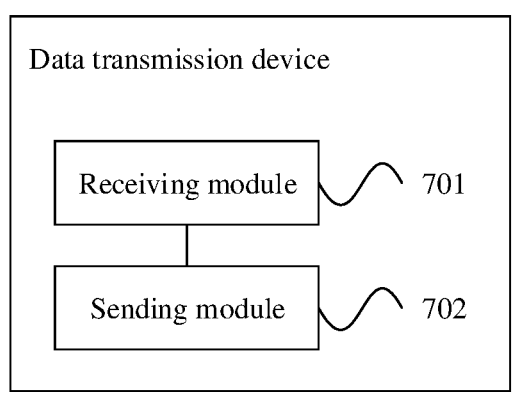
FIG. 11 is a schematic structural diagram 1 of a data transmission device according to an embodiment of this application.

FIG. 11 is a schematic structural diagram 1 of a data transmission device according to an embodiment of this application. Referring to FIG. 11, the data transmission device includes a receiving module 701 and a sending module 702.

The receiving module 701 is configured to obtain a first message from a second access network device. The first message requests context information of a terminal device.

The sending module 702 is configured to send a data packet to the second access network device.

The data transmission device is a corresponding access network device of the terminal device before a re-establishment procedure, and the second access network device is a corresponding access network device when the terminal device initiates the re-establishment procedure.

Optionally, the receiving module 701 is further configured to obtain protocol data unit PDU service receiving information from the second access network device. The PDU service receiving information includes identifier information of a first PDU session accepted by the second access network device and/or identifier information of a second PDU session rejected by the second access network device. The first PDU session and the second PDU session are PDU sessions of the terminal device established in the data transmission device.

The sending module 702 is specifically configured to send the data packet based on the PDU service receiving information.

Optionally, the PDU service receiving information further includes identifier information of a first quality of service QoS flow accepted by the second access network device and/or identifier information of a second QoS flow rejected by the second access network device. The first QoS flow and the second QoS flow are QoS flows corresponding to a service of the terminal device established in the data transmission device.

Optionally, the PDU service receiving information further includes first information and/or second information.

The first information includes identifier information of a first data radio bearer DRB that requires data forwarding, and an uplink general packet radio service tunneling protocol GTP tunnel address and/or a downlink general packet radio service tunneling protocol GTP tunnel address corresponding to the first DRB. The first DRB is a DRB corresponding to the service of the terminal device established in the first access network device. The second information includes a GTP tunnel address corresponding to the first PDU session.

Optionally, the sending module 702 is further configured to send transmission status indication information to the second access network device. The transmission status indication information indicates a transmission status of a data packet of the service of the terminal device established in the first access network device.

The transmission status indication information includes: identifier information of a DRB; length information of a count value of a data packet; and a count value assigned by the second access network device to a next downlink data packet that has not been assigned a count value.

Optionally, the transmission status indication information further includes at least one of the following: a count value of the first uplink data packet lost by the data transmission device; and first indication information used to indicate whether an uplink data packet sent by the terminal device is successfully received by the data transmission device.

The data transmission device in this embodiment may be configured to execute the technical solutions of the first access network device in the method embodiments shown in FIG. 3 to FIG. 6. An implementation principle and a technical effect of the data transmission device are similar to those of the first access network device. Details are not described herein again.

Figure 12:
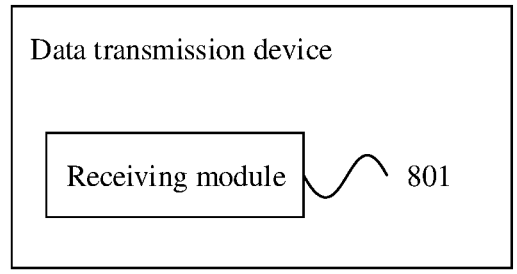
FIG. 12 is a schematic structural diagram 2 of a data transmission device according to an embodiment of this application.

FIG. 12 is a schematic structural diagram 2 of a data transmission device according to an embodiment of this application. Referring to FIG. 12, the data transmission device includes a receiving module 801.

The receiving module 801 is configured to obtain second instruction information from a second access network device. The second instruction information is used to instruct the data transmission device not to send a data packet to the second access network device.

The data transmission device in this embodiment may be configured to execute the technical solutions of the first access network device in the embodiment shown in FIG. 7. An implementation principle and a technical effect of the data transmission device are similar to those of the first access network device. Details are not described herein again.

Figure 13:
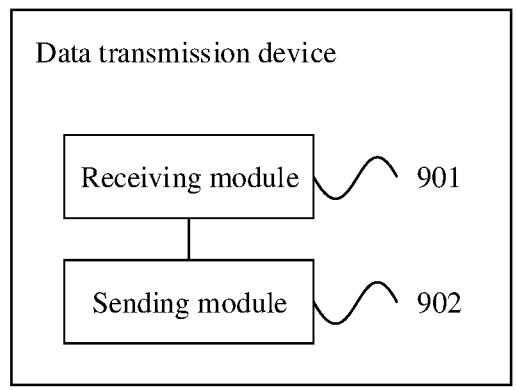
FIG. 13 is a schematic structural diagram 3 of a data transmission device according to an embodiment of this application.

FIG. 13 is a schematic structural diagram 3 of a data transmission device according to an embodiment of this application. Referring to FIG. 13, the data transmission device includes a receiving module 901 and a sending module 902.

The sending module 902 is configured to send a first message to a first access network device. The first message requests context information of a terminal device.

The receiving module 901 is configured to receive a data packet from the first access network device.

The first access network device is a corresponding access network device of the terminal device before a re-establishment procedure, and the data transmission device is a corresponding access network device when the terminal device initiates the re-establishment procedure.

Optionally, the sending module 902 is further configured to send protocol data unit PDU service receiving information to the first access network device. The PDU service receiving information includes identifier information of a first PDU session accepted by the data transmission device and/or identifier information of a second PDU session rejected by the data transmission device. The first PDU session and the second PDU session are PDU sessions of the terminal device established in the first access network device.

Optionally, the PDU service receiving information further includes identifier information of a first quality of service QoS flow accepted by the data transmission device and/or identifier information of a second QoS flow rejected by the data transmission device. The first QoS flow and the second QoS flow are QoS flows corresponding to a service of the terminal device established in the first access network device.

Optionally, the PDU service receiving information further includes first information and/or second information.

The first information includes identifier information of a first data radio bearer DRB that requires data forwarding, and an uplink general packet radio service tunneling protocol GTP tunnel address and/or a downlink general packet radio service tunneling protocol GTP tunnel address corresponding to the first DRB. The first DRB is a DRB corresponding to the service of the terminal device established in the first access network device. The second information includes a GTP tunnel address corresponding to the first PDU session.

Optionally, the receiving module 901 is further configured to obtain transmission status indication information from the first access network device. The transmission status indication information indicates a transmission status of a data packet of the service of the terminal device established in the first access network device.

The transmission status indication information includes: identifier information of a DRB; length information of a count value of a data packet; and a count value assigned by the data transmission device to a next downlink data packet that has not been assigned a count value.

Optionally, the transmission status indication information further includes at least one of the following: a count value of the first uplink data packet lost by the first access network device; and first indication information used to indicate whether an uplink data packet sent by the terminal device is successfully received by the first access network device.

The data transmission device in this embodiment may be configured to execute the technical solutions of the second access network device in the method embodiments shown in FIG. 3 to FIG. 6. An implementation principle and a technical effect of the data transmission device are similar to those of the second access network device. Details are not described herein again.

Figure 14:
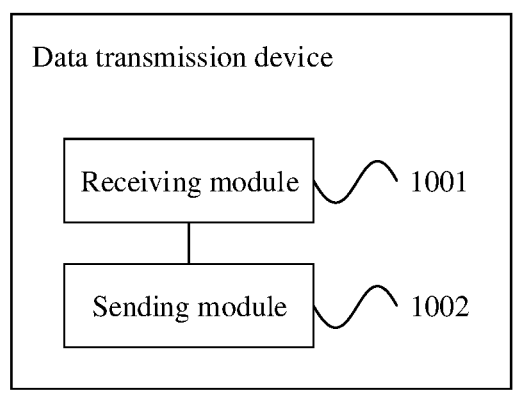
FIG. 14 is a schematic structural diagram 4 of a data transmission device according to an embodiment of this application.

FIG. 14 is a schematic structural diagram 4 of a data transmission device according to an embodiment of this application. Referring to FIG. 14, the data transmission device includes a receiving module 1001 and a sending module 1002.

The receiving module 1001 is configured to obtain a re-establishment request message from a terminal device.

The sending module 1002 is configured to send first reset instruction information to the terminal device. The first reset instruction information is used to instruct to reset a count value of an uplink data packet, and delete a data packet in a first data packet set. The first data packet set is a set of downlink data packets received by the terminal device from a first access network device, or the first data packet set is a set that includes a downlink data packet received by the terminal device from a first access network device and an uplink data packet that has been assigned a count value.

The sending module 1002 is further configured to send second instruction information to the first access network device. The second instruction information is used to instruct the first access network device not to send a data packet to the data transmission device.

The data transmission device in this embodiment may be configured to execute the technical solutions of the second access network device in the method embodiment shown in FIG. 7. An implementation principle and a technical effect of the data transmission device are similar to those of the second access network device. Details are not described herein again.

Figures 15, 16:
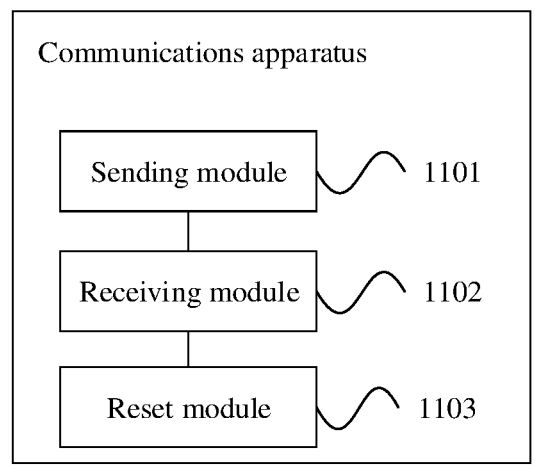
FIG. 15 is a schematic structural diagram 2 of a communications apparatus according to an embodiment of this application.
FIG. 16 is a schematic structural diagram 3 of a communications apparatus according to an embodiment of this application.

FIG. 15 is a schematic structural diagram 2 of a communications apparatus according to an embodiment of this application. Referring to FIG. 15, the communications apparatus includes a sending module 1101, a receiving module 1102, and a reset module 1103.

The sending module 1101 is configured to send a re-establishment request message to a second access network device. The second access network device is a corresponding access network device when a terminal device initiates a re-establishment procedure.

The receiving module 1102 is configured to obtain first reset instruction information from the second access network device. The first reset instruction information is used to instruct to reset a count value of an uplink data packet, and delete a data packet in a first data packet set. The first data packet set is a set of downlink data packets received by the terminal device from the first access network device, or the first data packet set is a set that includes a downlink data packet received by the terminal device from the first access network device and an uplink data packet that has been assigned a count value. The first access network device is a corresponding access network device of the terminal device before the re-establishment procedure.

The reset module 1103 is configured to: based on the first reset instruction information, reset the count value of the uplink data packet, and delete the data packet in the first data packet set.

The communications apparatus in this embodiment may be configured to execute the technical solution executed by the terminal device in the method embodiment shown in FIG. 7. An implementation principle and a technical effect of the communications apparatus are similar to those of the terminal device. Details are not described herein again. It may be understood that the communications apparatus in this embodiment may be the terminal device, or may be a component that can be used in the terminal device. This is not limited in this embodiment of this application.

FIG. 16 is a schematic structural diagram 3 of a communications apparatus according to an embodiment of this application. Referring to FIG. 16, the communication apparatus includes a determining module 1201 and a reset module 1202.

The determining module 1201 is configured to determine whether a cell in which a re-establishment request is initiated and a cell whose connection failure is detected by the communication apparatus are a same cell.

The reset module 1202 is configured to: if the cell in which the re-establishment request is initiated and the cell whose connection failure is detected by the communication apparatus are not the same cell, reset a count value of an uplink data packet, and delete a data packet in a first data packet set. The first data packet set is a set of downlink data packets received by the communication apparatus, or the first data packet set is a set that includes a downlink data packet received by the communication apparatus and an uplink data packet that has been assigned a count value.

The communications apparatus in this embodiment may be configured to execute the technical solution executed by the terminal device in the method embodiment shown in FIG. 8. An implementation principle and a technical effect of the communications apparatus are similar to those of the terminal device. Details are not described herein again. It may be understood that the communications apparatus in this embodiment may be the terminal device, or may be a component that can be used in the terminal device. This is not limited in this embodiment of this application.

It should be noted that, in the embodiments of this application, division into the modules is an example, and is merely logical function division. In actual implementation, another division manner may be used. Function modules in the embodiments of this application may be integrated into one processing module, or each of the modules may exist alone physically, or two or more modules may be integrated into one module. The integrated module may be implemented in a form of hardware, or may be implemented in a form of a software function module.

When the integrated module is implemented in the form of the software function module and sold or used as an independent product, the integrated module may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    sending, by a second access network device, a first message to a first access network device, wherein the first message requests context information of a terminal device, and the first access network device is an access network device of the terminal device before the terminal device performs a re-establishment procedure to use the second access network device as the access network device of the terminal device;
    sending, by the first access network device, a first response message to the second access network device, wherein the first response message comprises the context information of the terminal device;
    sending, by the second access network device, protocol data unit (PDU) service receiving information to the first access network device, wherein the PDU service receiving information comprises identifier information of a first PDU session accepted by the second access network device or identifier information of a second PDU session rejected by the second access network device, and the first PDU session and the second PDU session are PDU sessions of the terminal device established at the first access network device before the terminal device performs the re-establishment procedure; and
    sending, by the first access network device, a data packet to the second access network device based on the PDU service receiving information.

2. The method according to claim 1, wherein the PDU service receiving information further comprises:
    identifier information of a first quality of service (QoS) flow accepted by the second access network device, wherein the first QoS flow corresponds to a service of the terminal device established at the first access network device before the terminal device performs the re-establishment procedure; or
    identifier information of a second QoS flow rejected by the second access network device, wherein the second QoS flow corresponds to a service of the terminal device established at the first access network device before the terminal device performs the re-establishment procedure.

3. The method according to claim 1, wherein the PDU service receiving information further comprises:
    first information comprising identifier information of a first data radio bearer (DRB) that requires data forwarding, and an uplink general packet radio service tunneling protocol (GTP) tunnel address or a downlink general packet radio service tunneling protocol (GTP) tunnel address corresponding to the first DRB, wherein the first DRB corresponds to a service of the terminal device established at the first access network device before the terminal device performs the re-establishment procedure; or
    second information comprising a GTP tunnel address corresponding to the first PDU session.

4. The method according to claim 1, further comprising:
    sending, by the first access network device, transmission status indication information to the second access network device, wherein the transmission status indication information indicates a transmission status of a data packet of a service of the terminal device established at the first access network device before the terminal device performs the re-establishment procedure, and wherein the transmission status indication information comprises:
    identifier information of a data radio bearer (DRB);
    length information of a count value of a data packet; and
    a count value assigned by the second access network device to a next downlink data packet that has not been assigned a count value.

5. The method according to claim 4, wherein the transmission status indication information further comprises at least one of the following:
    a count value of a first uplink data packet lost by the first access network device; or
    first indication information indicating whether an uplink data packet sent by the terminal device is successfully received by the first access network device.

6. The method according to claim 1, wherein the context information of the terminal device includes PDU session resource information of the terminal device established at the first access network device before the terminal device performs the re-establishment procedure.

7. A data transmission system, comprising:
    a first access network apparatus; and
    a second access network apparatus, configured to:
        send a first message to the first access network apparatus, wherein the first message requests context information of a terminal device, and the first access network apparatus is an access network apparatus of the terminal device before the terminal device performs a re-establishment procedure to use the second access network apparatus as the access network apparatus of the terminal device; and
        send protocol data unit (PDU) service receiving information to the first access network apparatus, wherein the PDU service receiving information comprises identifier information of a first PDU session accepted by the second access network apparatus or identifier information of a second PDU session rejected by the second access network apparatus, and the first PDU session and the second PDU session are PDU sessions of the terminal device established at the first access network apparatus before the terminal device performs the re-establishment procedure;
    wherein the first access network apparatus is configured to:
        send a first response message to the second access network apparatus, wherein the first response message comprises the context information of the terminal device; and send a data packet to the second access network apparatus based on the PDU service receiving information.

8. The system according to claim 7, wherein the PDU service receiving information further comprises:
identifier information of a first quality of service (QoS) flow accepted by the second access network apparatus, wherein the first QoS flow corresponds to a service of the terminal device established at the first access network apparatus before the terminal device performs the re-establishment procedure; or
identifier information of a second QoS flow rejected by the second access network apparatus, wherein the second QoS flow corresponds to a service of the terminal device established at the first access network apparatus before the terminal device performs the re-establishment procedure.

9. The system according to claim 7, wherein the PDU service receiving information further comprises:
first information, wherein the first information comprises identifier information of a first data radio bearer (DRB) that requires data forwarding, and an uplink general packet radio service tunneling protocol (GTP) tunnel address or a downlink general packet radio service tunneling protocol (GTP) tunnel address corresponding to the first DRB, and wherein the first DRB corresponds to a service of the terminal device established at the first access network apparatus before the terminal device performs the re-establishment procedure; or
second information, comprising a GTP tunnel address corresponding to the first PDU session.

10. The system according to claim 7, wherein the first access network apparatus is further configured to:
send transmission status indication information to the second access network apparatus, wherein the transmission status indication information indicates a transmission status of a data packet of a service of the terminal device established at the first access network apparatus before the terminal device performs the re-establishment procedure, wherein the transmission status indication information comprises:
identifier information of a data radio bearer (DRB);
length information of a count value of a data packet; and
a count value assigned by the second access network apparatus to a next downlink data packet that has not been assigned a count value.

11. The system according to claim 10, wherein the transmission status indication information further comprises at least one of the following:
a count value of a first uplink data packet lost by the first access network apparatus; or
first indication information indicating whether an uplink data packet sent by the terminal device is successfully received by the first access network apparatus.

12. The system according to claim 7, wherein the context information of the terminal device includes PDU session resource information of the terminal device established at the first access network device before the terminal device performs the re-establishment procedure.

13. A method, comprising:
sending, by a second access network device, a first message to a first access network device, wherein the first message requests context information of a terminal device, and the first access network device is an access network device of the terminal device before the terminal device performs a re-establishment procedure to use the second access network device as the access network device of the terminal device;
sending, by the second access network device, protocol data unit (PDU) service receiving information to the first access network device, wherein the PDU service receiving information comprises identifier information of a first PDU session accepted by the second access network device or identifier information of a second PDU session rejected by the second access network device, and the first PDU session and the second PDU session are PDU sessions of the terminal device established at the first access network device before the terminal device performs the re-establishment procedure; and
receiving, by the second access network device, a data packet from the first access network device based on the PDU service receiving information.

14. The method according to claim 13, wherein the PDU service receiving information further comprises:
identifier information of a first quality of service (QoS) flow accepted by the second access network device, wherein the first QoS flow corresponds to a service of the terminal device established at the first access network device before the terminal device performs the re-establishment procedure; or
identifier information of a second QoS flow rejected by the second access network device, wherein the second QoS corresponds to a service of the terminal device established at the first access network device before the terminal device performs the re-establishment procedure.

15. The method according to claim 13, wherein the PDU service receiving information further comprises:
first information, comprising identifier information of a first data radio bearer (DRB) that requires data forwarding, and an uplink general packet radio service tunneling protocol (GTP) tunnel address or a downlink general packet radio service tunneling protocol (GTP) tunnel address corresponding to the first DRB, wherein the first DRB corresponds to a service of the terminal device established at the first access network device before the terminal device performs the re-establishment procedure; or
second information, comprising a GTP tunnel address corresponding to the first PDU session.

16. The method according to claim 13, further comprising:
obtaining, by the second access network device, transmission status indication information from the first access network device, wherein the transmission status indication information indicates a transmission status of a data packet of a service of the terminal device established at the first access network device before the terminal device performs the re-establishment procedure, and wherein the transmission status indication information comprises:
identifier information of a data radio bearer (DRB);
length information of a count value of a data packet; and
a count value assigned by the second access network device to a next downlink data packet that has not been assigned a count value.

17. The method according to claim 16, wherein the transmission status indication information further comprises at least one of the following:
a count value of a first uplink data packet lost by the first access network device; or first indication information used to indicate whether an uplink data packet sent by the terminal device is successfully received by the first access network device.

18. The method according to claim 13, wherein the context information of the terminal device includes PDU session resource information of the terminal device established at the first access network device before the terminal device performs the re-establishment procedure.

* * * * *